(12) United States Patent
Banks

(10) Patent No.: US 8,471,895 B2
(45) Date of Patent: Jun. 25, 2013

(54) SYSTEMS AND METHODS OF HIGH RESOLUTION THREE-DIMENSIONAL IMAGING

(76) Inventor: Paul S. Banks, San Marcos, CA (US)

(*) Notice: Subject to any disclaimer, the term of this patent is extended or adjusted under 35 U.S.C. 154(b) by 798 days.

(21) Appl. No.: 12/626,492

(22) Filed: Nov. 25, 2009

(65) Prior Publication Data

US 2010/0128109 A1 May 27, 2010

Related U.S. Application Data

(60) Provisional application No. 61/117,788, filed on Nov. 25, 2008, provisional application No. 61/121,096, filed on Dec. 9, 2008, provisional application No. 61/166,413, filed on Apr. 3, 2009.

(51) Int. Cl.
*H04N 13/02* (2006.01)

(52) U.S. Cl.
USPC .............................. 348/46; 348/38; 382/284

(58) Field of Classification Search
USPC ....................... 348/38, 46; 382/284
See application file for complete search history.

(56) References Cited

U.S. PATENT DOCUMENTS

| | | | |
|---|---|---|---|
| 3,569,988 A * | 3/1971 | Schmidt et al. | 348/57 |
| 3,644,017 A | 2/1972 | Ploss | |
| 3,838,906 A | 10/1974 | Kumada | |
| 4,935,616 A | 6/1990 | Scott | |
| 4,967,270 A | 10/1990 | Ulich et al. | |
| 5,157,451 A | 10/1992 | Taboada et al. | |
| 5,162,861 A | 11/1992 | Tamburino et al. | |
| 5,200,793 A | 4/1993 | Ulich et al. | |
| 5,394,413 A | 2/1995 | Zayhowski | |
| 6,088,086 A | 7/2000 | Muguira et al. | |
| 6,456,793 B1 | 9/2002 | Ray et al. | |
| 6,515,737 B2 | 2/2003 | Perry | |
| 6,781,763 B1 | 8/2004 | Tamburino et al. | |
| 7,224,382 B2 * | 5/2007 | Baker | 348/46 |
| 7,301,138 B2 | 11/2007 | Yafuso | |
| 7,444,013 B2 * | 10/2008 | Chen | 382/154 |
| 7,751,109 B1 | 7/2010 | Hoffman et al. | |

(Continued)

OTHER PUBLICATIONS

Chen et al., "Actively Q-switched Nd:YVO$_4$ laser using an electro-optic periodically poled lithium niobate crystal as a laser Q-switch," Optics Letters, vol. 28, No. 16, Aug. 15, 2003, pp. 1460-1462.

(Continued)

*Primary Examiner* — Sath V Perungavoor
*Assistant Examiner* — Jeffery Williams
(74) *Attorney, Agent, or Firm* — Gavrilovich, Dodd & Lindsey LLP

(57) ABSTRACT

Embodiments of the invention provide systems and methods for three-dimensional imaging with wide field of view and precision timing. In accordance with one aspect, a three-dimensional imaging system includes an illumination subsystem configured to emit a light pulse with a divergence sufficient to irradiate a scene having a wide field of view. A sensor subsystem is configured to receive over a wide field of view portions of the light pulse reflected or scattered by the scene and including: a modulator configured to modulate as a function of time an intensity of the received light pulse portion to form modulated received light pulse portions; and means for generating a first image corresponding to the received light pulse portions and a second image corresponding to the modulated received light pulse portions. A processor subsystem is configured to obtain a three-dimensional image based on the first and second images.

20 Claims, 16 Drawing Sheets

U.S. PATENT DOCUMENTS

| | | | |
|---|---|---|---|
| 7,995,191 B1 | 8/2011 | Sandusky | |
| 8,106,940 B2* | 1/2012 | Takagi et al. | 348/51 |
| 2002/0085608 A1 | 7/2002 | Kopf et al. | |
| 2002/0139853 A1* | 10/2002 | Tsikos et al. | 235/462.01 |
| 2003/0089779 A1* | 5/2003 | Giordano et al. | 235/454 |
| 2004/0041082 A1 | 3/2004 | Harmon | |
| 2004/0165080 A1* | 8/2004 | Burks et al. | 348/222.1 |
| 2006/0077395 A1 | 4/2006 | Chan et al. | |
| 2007/0041075 A1 | 2/2007 | Gupta et al. | |

OTHER PUBLICATIONS

Juberts et al., "Status report on next generation LADAR for driving unmanned ground vehicles," Mobile Robots XVII, Proceedings of SPIE vol. 5609, 2004, Billingham WA, 12 pages.

Kodak, "KAI-16000 Image Sensor" Device Performance Specification Revision 1.0 MTD/PS-1027, Jan. 29, 2007, 32 pages.

Stettner, "Three dimensional flash ladar focal planes and time dependent imaging," ISSSR Conference May 31, 2006, 18 pages.

Stone et al., "Performance Analysis of Next-Generation LADAR for Manufacturing, Construction, and Mobility," National Institute of Standards and Technology NISTIR 7117, May 2004, Gaithersburg MD, 198 pages.

Turner, "Standoff precision ID in 3-D (SPI-3D)," abstract available for download from http://www.darpa.mil/ipto/programs/spi3d/spi3d.asp, downloaded Oct. 1, 2009, 1 page.

West, "Extending the field of view of KD*P electrooptic modulators," Applied Optics, vol. 17, No. 18, Sep. 15, 1978, pp. 3010-3013.

Zayhowski, "Q-switched operation of microchip lasers," Optics Letters, vol. 16, No. 8, Apr. 15, 1991, pp. 575-577.

Skeldon, M.D. et al., "Performance of longitudinal mode KD*P Pockels cells with transparent conductive coatings," SPIE vol. 1410 Solid State Lasers II (1991), pp. 116-124.

Turner, Monte, "Standoff Precision ID in 3-D (SPI-3D)," DARPA website page at http://www.darpa.mil/ipto/programs/spi3d/spi3d_vision.asp, Jan. 12, 2009.

West E.A. et al., "Larg Field-of-View KD*P Modulator for Solar Polarization Measurements," Solar Polarization 4, ASP Conference Series, vol. 358, pp. 209-212 (2006).

West, Ed, "DC Bias Modulation Characteristics of Longitudinal KD*P Modulators," SPIE vol. 1746, Polarization Analysis and Measurement, pp. 386-394 (1992).

West, Ed, "Large Field-of-View KD*P Modulator for Solar Polarization Measurements," SPIE 5888-6, pp. 1-9 (2005).

West, Ed, "Large Field-of-View KD*P Modulator," SPIE vol. 1317 Polarimetry: Radar, Infrared, Visible, Ultraviolet, and X-Ray, pp. 312-323 (1990).

Zarrabi, Joseph, "A Compact and Multi-Purpose Diode-pumpd Unstable Laser with Dual Pulse width Output," General Atomics, Photonics Division, San Diego, CA, pp. 1-12 (2006).

Ayer, Kevin, "Laser Imagin and Ranging System (LIMARS): A proof of concept experiment," SPIE vol. 1663 Laser Radar VII pp. 54-62 (1992).

Kawakita, Mashiro, "Gain-modulated Axi-Vision Camera (high speed high-accuracy depth-mapping camera)," Optics Express, vol. 12, No. 22, pp. 5336-5344 (Nov. 11, 2004).

Carpenter, Robert, "The Electro-Optic Effect in Uniaxial Crystals of the Dihydrogen Phosphate Type III. Measurement of Coefficients," Journal of the Optical Society of America, vol. 4, No. 4, pp. 225-229 (Apr. 1950).

Billings, Bruce, "The Electro-Optic Effect in Uniaxial Crystals of the Dihydrogen Phosphate ($XH_2PO_4$) Type. IV. Angular Field of the Electro-Optic Shutter," Journal of the Optical Society of America, vol. 42, No. 1, pp. 12-20 (Jan. 1952).

Billings, Bruce, "The Electro-Optic Effect in Uniaxial Crystals of the Type X $H_2PO_4$. I. Theoretical," Journal of the Optical Society of America, vol. 39, No. 10, pp. 797-801 (Oct. 1949).

Billings, Bruce, "The Electro-Optic Effect in Uniaxial Crystals of the Type $XH_2PO_4$. II. Experimental," Journal of the Optical Society of America, vol. 39, No. 10, pp. 802-808 (Oct. 1949).

Billings, Bruce, "Scalar Polarization Fringes Produced by the Superposition of Crystalline Plates," Journal of the Optical Society of America, vol. 34, No. 5, pp. 267-269 (May 1944).

Enemark, E.A. et al., "A Pockels Cell Light Modulator for Wide Angle Radiation," The Review of Scientific Instruments, vol. 40, No. 1, pp. 40-41 (Jan. 1969).

Lange, R. et al., "Time-of-flight range imaging with a custom solid-state image sensor," Laser Metrology and Inspection, Proc. SPIE, vol. 3823, pp. 1-12, Munich, Germany (1999).

Marino, Richard et al., "A compact 3D imaging laser radar system using Geiger-mode APD arrays: system and measurements," Laser Radar Technology and Applications VIII, Proceedings of SPIE vol. 5086, pp. 1-15 (2003).

Ringbeck, Thorsten et al., "A 3D Time of Flight Camera for Object Detection," Optical 3-D Measurement Techniques 09—Dec. 7, 2007 ETH Zürich Plenary Session 1: Range Imaging I, 10 pages (2007).

* cited by examiner

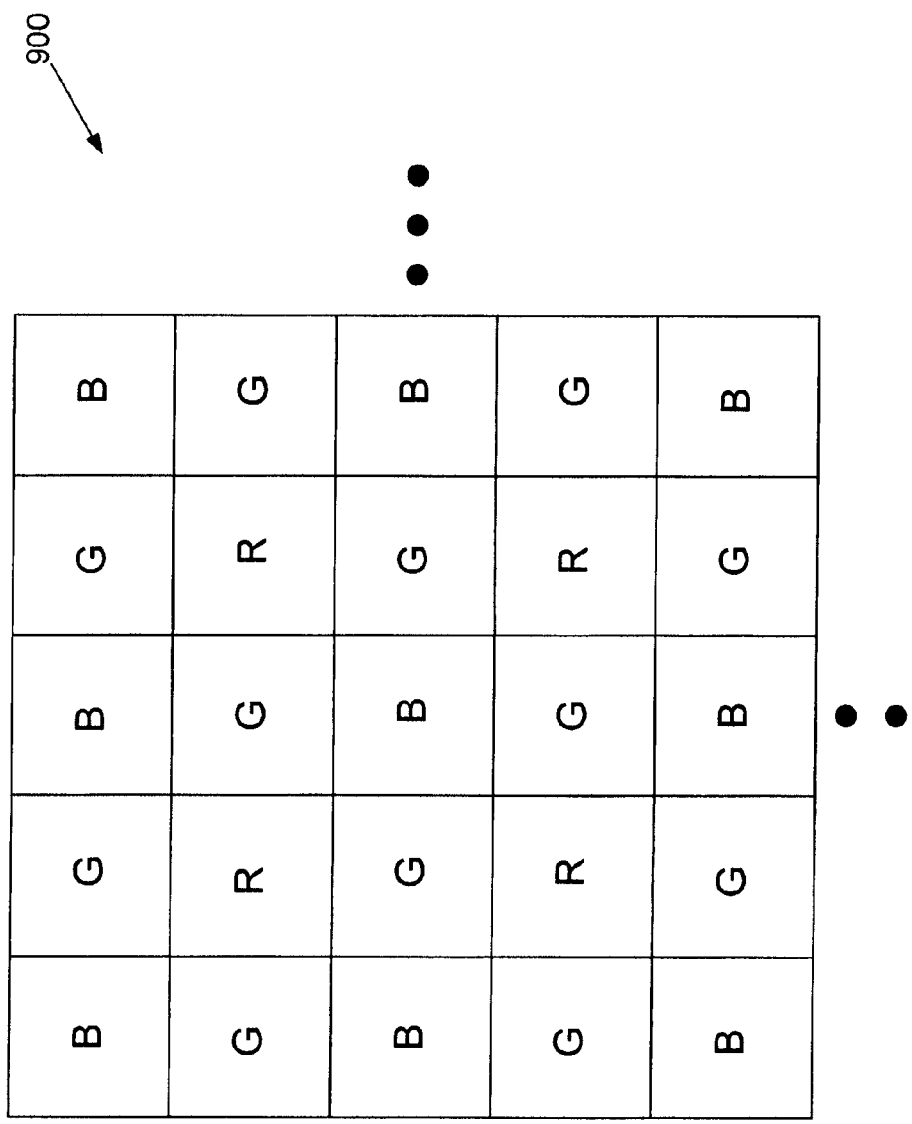

SYSTEMS AND METHODS OF HIGH RESOLUTION THREE-DIMENSIONAL IMAGING

CROSS-REFERENCE TO RELATED APPLICATIONS

This application claims the benefit of the following applications, the entire contents of each of which are incorporated by reference herein:

U.S. Provisional Patent Application No. 61/117,788, filed Nov. 25, 2008 and entitled "Method and Apparatus for a 3D Digital Imaging Device;"

U.S. Provisional Patent Application No. 61/121,096, filed Dec. 9, 2008 and entitled "Method and Apparatus for Wide Field of View Large Aperture, Low Voltage Optical Shutter;" and U.S. Provisional Patent Application No. 61/166,413, filed Apr. 3, 2009 and entitled "Method and Apparatus for Large Divergence Laser Illuminator."

FIELD OF THE INVENTION

This application generally relates to systems and methods of three-dimensional imaging.

BACKGROUND OF THE INVENTION

Digital electronics have made it possible to record a grey scale or color image of a scene, as a still image, as a series of still images, or as a video. A video is a series of still images that continues for an extended period of time with a specific interval between each image. Analog imaging utilizes photographic film to obtain an image, whereas digital imaging utilizes a focal plane array (FPA) to obtain an image which provides a signal in response to light illumination that is then digitized. The FPA includes an array of light-detecting elements, or pixels, positioned at a focal plane of optics that image a scene. Much recent effort has been directed to improving the density, size, sensitivity, dynamic range, and noise characteristics of FPAs, as well as the associated optics and electronics, enabling higher resolution images to be acquired. However, most FPAs by their nature cannot detect color, only the presence and quantity of light. Additional techniques have been developed to recreate the color seen by the human eye in a color digital image, such as the use of Bayer filters as described in U.S. Pat. No. 3,971,065, and subsequent developments thereof, or multiple FPAs with bandpass color filters. Other FPAs have been developed that detect color directly.

Additionally, FPAs are limited to collecting information about light emanating from a scene in two dimensions, horizontal (x) and vertical (y), in front of the imaging device, often referred to as the field-of-view (FOV). Most FPAs cannot, by themselves, obtain information about the distance (z) of an object from the FPA without the use of complex, high speed, expensive read-out circuits. A wide variety of imaging techniques have been developed to attempt to extract, from a two-dimensional image, information about the distance of a scene and of three-dimensional objects within that scene. Some such techniques may be based on information in a single two-dimensional image, such as analyzing the positions and depths of any shadows and the apparent position and type of light source to infer information about the distance of objects in the image. Other such techniques, often referred to as stereoscopy or stereo photogrammetry, may be based on obtaining multiple two-dimensional images with multiple cameras positioned at different positions relative to the scene, and comparing information within the images to deduce the ranges and three-dimensional features of objects within the scene. Both types of techniques typically are computational intensive, provide only limited information about the three dimensional features of a scene, and may be unsuitable for moving objects. Additionally, stereoscopy typically requires precise knowledge of the relative position and angle at which the multiple two-dimensional images are obtained and so requires extensive calibration procedures and limited flexibility. The multiple views also means that more lines of sight will be obscured. This limits the use of such system in uncontrolled environments, can significantly increase the cost of any implementation, and limits the accuracy and precision of any calculated distance values.

Another approach to obtaining distance information for objects in a scene is based on scanning a laser beam over the scene, and determining the ranges and three-dimensional shapes of objects in a scene based on a phase or temporal delay of the laser beam, following reflection from the object. Specifically, the distance the laser beam travels from the light source, to a particular point in the scene, and then to a sensor can be calculated based on the phase delay or time of flight (TOF) of the laser beam, and the speed of light. Distance and shape information about objects in the scene may be obtained by scanning the laser beam, one point at a time, across the entire scene, and determining the phase delay or TOF of the laser beam at each point. Such scanning may be accomplished, for example, by moving mirrors or beam steering elements to change the beam direction. As such, the maximum scanning speed may be limited by the amount of time required to make a measurement at each point, and the speed of the mirror or beam steering element. Some such laser scanners are limited to processing tens of thousands to hundreds of thousands of points per second. Therefore, obtaining a high resolution image of a complex scene may take a large amount of time, although lowering the resolution of the image may reduce the time required to obtain the image. Image quality also may be degraded by performance drift during the scan, or motion within the scene. Additionally, scanning merely provides the value of the distance at each measurement point, resulting in what may be referred to as a "point cloud;" often no color or intensity information is obtained, and additional steps are required to transform the point cloud into a digital representation more suited to human interpretation. For example, color or grey-scale imagery may be collected in a separate step and combined with the point cloud data if a complete 3-dimensional image is desired.

U.S. Pat. No. 5,157,451 to Taboada et al. ("Taboada"), the entire contents of which are incorporated herein by reference, describes an alternative technique that combines digital imaging with distance measurements for long-range imaging of target objects. Specifically, Taboada discloses obtaining three-dimensional coordinates of a target object by irradiating the object with a laser pulse, and using a Kerr cell or Pockels cell to vary the polarization of the laser pulse reflected from the object as a function of time. As a result, the polarization state of portions of the laser pulse reflected by features of the object nearer the imaging system (shorter TOF), is affected to a small degree, while the polarization state of portions of the laser pulse reflected by features of the object further from the imaging system (longer TOF), will be affected more. By imaging the two polarization components of the polarization-modulated laser beam onto two separate FPAs, positional information about the object may be calculated. However, the systems and methods disclosed by Taboada have limited applicability, some of which are discussed further below.

As noted above, the system of Taboada utilizes a Kerr cell or Pockels cell, which are particular types of electro-optic modulators (EOMs), to modulate the polarization of the reflected laser pulse. In an EOM, an electric field is applied to a material that changes properties under the influence of an electric field. The EOM's change in properties modifies the phase of light transmitted therethrough. Pockels cells are based on the Pockels effect, in which a material's refractive index changes linearly with applied electric field, while Kerr cells are based on the Kerr effect, in which a material's refractive index varies quadratically with the electric field. For certain materials and certain orientations of applied electric field, the Pockels effect creates an anisotropy in the refractive index of the material. Such materials and fields may be used to create a Pockels cell, in which the induced anisotropy changes the polarization state of light transmitted therethrough linearly as a function of applied voltage. EOMs such as Pockels cells may be placed between crossed polarizers to modulate the intensity of light, as is known to those of ordinary skill in the art. The temporal response of a Pockels cell may in some circumstances be less than 1 nanosecond, enabling its use as a fast optical shutter.

Although widely used for laser applications, Pockels cells traditionally have been viewed as having significant limitations, rendering such devices unsuitable for optical switching in other types of applications. For example, in some applications, the incident light may contain a large range of angles. However, typical Pockels cells may only effectively modulate incident light deviating by less than about 1 degree from the surface normal, significantly limiting their use in such applications. Additionally, Pockels cells may require high electric fields, e.g., in excess of several kilovolts, to sufficiently rotate the polarization of light passing therethrough. The electronics required to generate such fields may be expensive and cumbersome. One approach for reducing the voltage required to drive the Pockels cell has been to use a transverse electric field and a transversely oriented Pockels cell. The phase change induced in such a cell is proportional to the ratio of the crystal thickness d (which is also the separation between the electrodes) to the crystal length L as given by:

$$V \propto \frac{\lambda d}{2n^3 r_{ij} L} \quad (1)$$

where $V_{1/2}$ is the half-wave voltage, i.e., the voltage required to induce a phase delay of π in light of one polarization relative to orthogonally polarized light, λ is the wavelength of light, n is the refractive index of the crystal, and $r_{ij}$ is the electro-optic tensor coefficient of the crystal. Reducing the thickness of the electro-optic crystal to bring the electrodes closer together may reduce the voltage, but also may reduce the clear aperture of the Pockels cell and may cause vignetting, e.g., loss of information at the edges of the image, reducing image quality. New materials are being sought that may function satisfactorily at lower voltages, such as periodically poled lithium niobate.

SUMMARY OF THE INVENTION

The present invention provides systems and methods of high resolution three-dimensional imaging, including those having a wide field of view and adjustable depth of field. Specifically, the systems and methods capture information about the ranges and shapes of multiple objects in a scene, which may be positioned at a variety of distances, with high resolution, e.g., sub-centimeter distance resolution.

In accordance with one aspect of the invention, a three-dimensional imaging system includes an illumination subsystem configured to emit a light pulse with a divergence sufficient to irradiate a scene having a wide field of view. The system further includes a sensor subsystem configured to receive over a wide field of view portions of the light pulse reflected or scattered by the scene, the sensor subsystem comprising: a modulator configured to modulate as a function of time an intensity of the received light pulse portions to form modulated received light pulse portions; and means for generating a first image corresponding to the received light pulse portions and a second image corresponding to the modulated received light pulse portions. The system further includes a processor subsystem configured to obtain a three-dimensional image based on the first and second images.

In some embodiments, the means for generating comprises first and second discrete arrays of light sensors, and optionally further includes an image constructor. The first and second discrete arrays of light sensors may be registered with one another. In other embodiments, the means for generating includes a single array of light sensors.

In some embodiments, the light pulse has a duration of less than 2 nanoseconds, or less than 1 nanosecond. In some embodiments, the divergence is between 1 and 180 degrees, for example, between 5 and 40 degrees. In some embodiments, the illumination subsystem comprises a low-coherence laser configured to generate light containing a sufficient number of modes to produce a smooth spatial profile. In some embodiments, the low-coherence laser comprises an active fiber core having a diameter greater than 50 µm. In some embodiments, the light pulse contains a visible wavelength. In some embodiments, the light pulse contains a near-infrared wavelength. In some embodiments, the near-infrared wavelength is between 1400 nm and 2500 nm. In some embodiments, the light pulse has a substantially uniform spatial profile. In some embodiments, the light pulse further has a substantially smooth temporal profile.

In some embodiments, the receiving lens has a diameter of at least 1 inch, or of at least 2 inches. In some embodiments, the modulator has a clear aperture of at least 0.5 inches, or at least 1 inch.

In some embodiments, the modulator comprises a Pockels cell. For example, the modulator may include a Pockels assembly comprising: a stack of transverse Pockels cells, each transverse Pockels cell comprising a slab of electro-optic material and first and second electrodes respectively disposed on opposing major surfaces of the slab; a first conductor in electrical contact with the first electrode of each transverse Pockels cell; a second conductor in electrical contact with the second electrode of each transverse Pockels cell; and a voltage source in electrical contact with the first and second conductors. In some embodiments, the voltage source applies a voltage of less than 100 V across the first and second electrodes of each transverse Pockels cell via the first and second conductors. In some embodiments, the voltage source applies a voltage of less than 25 V across the first and second electrodes of each transverse Pockels cell via the first and second conductors. In some embodiments, the electro-optic material is selected from the group consisting of potassium dihydrogen phosophate (KDP), potassium dideuterium phosphate (KD*P), lithium niobate (LN), periodically poled lithium niobate, lithium tantalate, rubidium titanyl phosphate (RTP), beta-barium borate (BBO) and isomorphs thereof. In some embodiments, the slab has a thickness less than 100 μm. In some embodiments, the first and second electrodes comprise a transparent conductor. The transparent conductor may have a refractive index that is approximately the same as a refractive index of the electro-optic material. In some embodiments, the Pockels assembly has a length L approximately equal to $$L = m\frac{4d^2n}{\lambda},$$

where m is an integer, d is a thickness of the slab, n is a number of transverse Pockels cells in the assembly, and λ is a wavelength of the light pulse.

In some embodiments, the processor subsystem comprises a controller configured to send a control signal to the modulator, the modulator configured to modulate the received light pulse portions monotonically as a function of time responsive to the control signal. In some embodiments, the processor subsystem may comprise discrete off-the-shelf components. In some embodiments, the processor subsystem comprises a controller configured to send a control signal to the modulator, the modulator configured to modulate the received light pulse portions non-monotonically as a function of time responsive to the control signal. In some embodiments, the modulator has a response function that is a function of time and voltage, and the system stores information characterizing the response function of the modulator. Some embodiments further include a compensator configured to increase an acceptance angle of the modulator.

In some embodiments, the means for generating comprises a polarizing beamsplitter. In other embodiments, the means for generating comprises a prism. In some embodiments, the means for generating includes at least one focal plane array comprising a plurality of pixels, each pixel having a well depth of 100,000 or more electrons. In some embodiments, the means for generating includes at least one focal plane array comprising a plurality of pixels, and further includes a filter having a plurality of regions, each region positioned in front of a pixel and configured to attenuate light transmitted to that pixel in a predetermined fashion. In some embodiments, the system stores a matrix characterizing the filter.

In some embodiments, the sensor subsystem further comprises a broadband or multiband (e.g., visible) imaging subsystem comprising: an image sensor configured to obtain a broadband or multiband image of the scene; and an optic configured to direct a portion of the received light to the image sensor. The processor subsystem may configured to combine the three-dimensional image with the broadband or multiband image to generate an image of the scene.

In some embodiments, at least one of the first and second images contains a region of maximum intensity, wherein the means for generating comprises a sensor array having a saturation limit, and wherein the system is configured to enhance a dynamic range of the three dimensional image by increasing an energy of the light pulse above the saturation limit of the sensor array.

In some embodiments, at least one of the first and second images contains a region of maximum intensity, the means for generating comprises a sensor array having a saturation limit, and the processor subsystem is configured to: send a first control signal to the illumination subsystem, the first control signal comprising an instruction to generate a light pulse having a first energy selected such that the region of maximum intensity is at or above a threshold percentage of the saturation limit of the sensor array but below the saturation limit; and obtain a first three-dimensional image based on reflected or scattered portions of the light pulse having the first energy. The processor subsystem further may be configured to: send a second control signal to the illumination subsystem, the second control signal comprising an instruction to generate a light pulse having a second energy selected such that the region of maximum intensity is above the saturation limit of the sensor array; and obtain a second three-dimensional based on reflected or scattered portions of the light pulse having the second energy. The processor subsystem further may be configured to combine the first and second three-dimensional images to obtain a third three-dimensional image having increased resolution compared to the first and second three-dimensional images. In some embodiments, the second energy is selected such that the region of maximum intensity is at least 4 times above the saturation limit of the focal plane array.

In some embodiments, the processor subsystem is configured to: instruct the illumination subsystem to emit a plurality of light pulses; adjust a timing of the modulator such that modulation begins at a different time for each light pulse of the plurality of light pulses; obtain a plurality of three-dimensional images corresponding to each light pulse of the plurality of light pulses; and obtain an enhanced three-dimensional image based on the plurality of three-dimensional images, the enhanced three-dimensional image corresponding to a larger distance window than a distance window of any of the plurality of three-dimensional images.

In some embodiments, the processor subsystem is configured to: send a first control signal to the illumination subsystem, the first control signal comprising an instruction to generate a first light pulse; send a second control signal to the modulator, the second control signal comprising an instruction to modulate received portions of the first light pulse over a first temporal window; obtain a first three-dimensional image based on the modulated portions of the first light pulse; send a third control signal to the illumination subsystem, the third control signal comprising an instruction to generate a second light pulse; send a fourth control signal to the modulator, the fourth control signal comprising an instruction to modulate received portions of the second light pulse over a second temporal window; obtain a second three-dimensional image based on the modulated portions of the second light pulse; and combine the first and second three-dimensional images to obtain a third three dimensional image having increased range as compared to the first and second three-dimensional images. The first and second temporal windows may overlap with one another. The first temporal window may have a shorter duration than the second temporal window. The first temporal window may have a different start time than the second temporal window.

In some embodiments, the three-dimensional image has subcentimeter resolution.

In accordance with another aspect of the present invention, a method of three-dimensional imaging includes: emitting a light pulse having a divergence sufficient to irradiate a scene having a wide field of view; receiving over a wide field of view portions of the light pulse reflected or scattered by the scene; modulating with a modulator the received light pulse portions as a function of time to form modulated received light pulse portions; generating a first image corresponding to the received light pulse portions; generating a second image corresponding to the modulated received light pulse portions; and obtaining a three-dimensional image of the scene based on the first and second images.

In some embodiments, generating the first image comprises adding the second image to a third image. In some embodiments, modulating with the modulator comprises modulating a polarization state of the received light pulse portions.

In accordance with another aspect of the present invention, a modulator for modulating the polarization of light having a wavelength λ includes: a stack of transverse Pockels cells, each transverse Pockels cell comprising a slab of electro-optic material and first and second electrodes respectively disposed on opposing major surfaces of the slab; a first conductor in electrical contact with the first electrode of each transverse Pockels cell; a second conductor in electrical contact with the second electrode of each transverse Pockels cell; and a voltage source in electrical contact with the first and second conductors, the slab of each transverse Pockels cell having a length L approximately equal to $$L = m\frac{4d^2n}{\lambda},$$

where m is an integer, d is a thickness of the slab, and n is a number of transverse Pockels cells in the stack.

In some embodiments, the voltage source applies a voltage of less than 100 V across the first and second electrodes of each transverse Pockels cell via the first and second conductors. In some embodiments, the voltage source applies a voltage of less than 25 V across the first and second electrodes of each transverse Pockels cell via the first and second conductors. In some embodiments, the electro-optic material is selected from the group consisting of potassium dihydrogen phosphate (KDP), potassium dideuterium phosphate (KD*P), lithium niobate (LN), periodically poled lithium niobate, lithium tantalate, rubidium titanyl phosphate (RTP), beta-barium borate (BBO) and isomorphs thereof. In some embodiments, the electro-optic material comprises periodically poled lithium niobate. In some embodiments, the slab has a thickness less than 100 μm. In some embodiments, the first and second electrodes comprise a transparent conductor. In some embodiments, the wavelength is in the visible range. In some embodiments, the wavelength is in the near-infrared range. In some embodiments, the wavelength is between 1400 nm and 2500 nm. In some embodiments, the modulator has an acceptance angle of at least 40 degrees. In some embodiments, the modulator has an acceptance angle of at least 5 degrees. In some embodiments, the modulator has an acceptance angle of at least 1 degree. In some embodiments, the modulator further has a clear aperture of at least 1 inch, for example, of at least 2 inches.

In accordance with yet another aspect of the present invention, a modulator for modulating the polarization of light includes: a stack of transverse Pockels cells, each transverse Pockels cell comprising a slab of electro-optic material and first and second electrodes respectively disposed on opposing major surfaces of the slab; a first conductor in electrical contact with the first electrode of each transverse Pockels cell; a second conductor in electrical contact with the second electrode of each transverse Pockels cell; and a voltage source in electrical contact with the first and second conductors, the first and second conductors comprising a transparent conductor having approximately the same refractive index as does the electro-optic material.

BRIEF DESCRIPTION OF THE DRAWINGS

FIG. 9A schematically illustrates a color filter that may be used to increase the dynamic range of a focal plane array used in a three-dimensional imaging system, according to some embodiments of the present invention.

DETAILED DESCRIPTION

1. Overview

Figure 1:
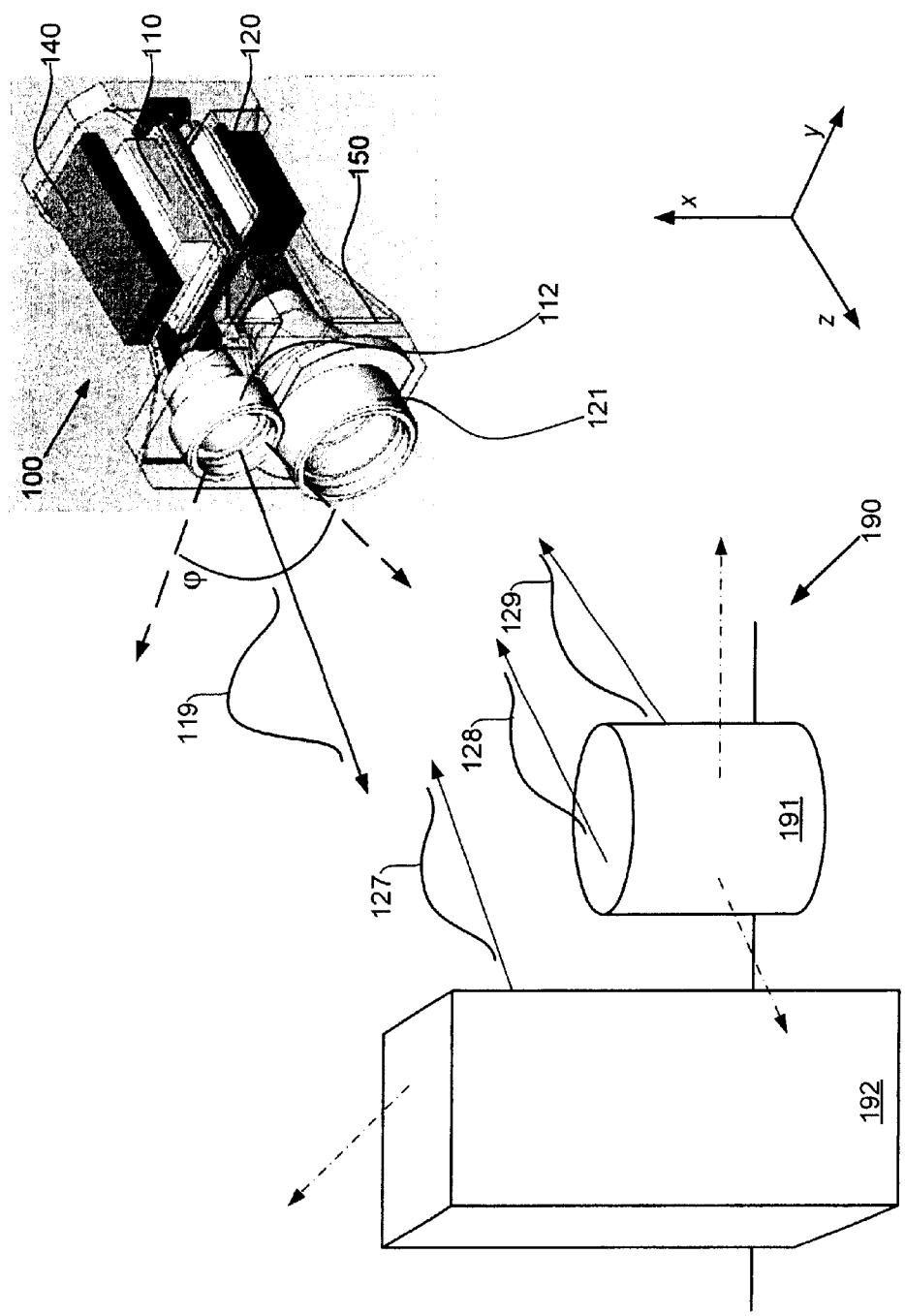
FIG. 1 illustrates a perspective view of a system for obtaining a three-dimensional image of a scene, according to some embodiments of the present invention.

Embodiments of the invention provide systems and methods for obtaining high resolution images of scenes, including wide field of view scenes. Specifically, the systems and methods may simultaneously record three dimensional position information for multiple objects in a scene with high spatial and distance resolution, along with intensity (grey-scale or color) information about the scene. This information, both coordinate and intensity, is recorded for every pixel in an array of pixels for each image. The intensity and position information are combined into a single three-dimensional image that approximates a human view of the scene, and which further records the three-dimensional coordinates of the shape and relative position of each object in the scene. A series of such images may be acquired in similar fashion to a digital video camera, providing a "movie" of changes in the scene over time, each three-dimensional image in the movie being referred to as a frame. In many circumstances, the scene being imaged may include many objects at a variety of distances from the system. The inventive system records the three-dimensional coordinate and intensity of the portion of an object corresponding to each pixel element, thus providing the three dimensional shape of each individual object in the scene as well as the overall coordinates, with respect to the three-dimensional imaging device as well as other portions of the scene in the image recorded by the three dimensional imaging device, of the objects in the scene. If an absolute frame of reference is desired, a GPS unit or other suitable means for fixing the absolute position of the imaging system may be included.

One aspect of this invention provides the ability to record three-dimensional information and color or monochrome imagery for a wide variety of scenes, with particular attention to those that include close objects. For short-range imaging applications (e.g., objects nearer than 1 km), it is often useful to observe objects distributed across a large spatial region. This translates to a need for a wide field of view (FOV). In the context of the present invention, a "wide field of view" refers to a field subtending an angle of one degree or greater. The field of view is typically expressed as the angular separation between the sides of a scene. For some uses of the systems and methods described herein, FOVs of greater than 1 degree, or greater than 5 degrees, or greater than 10 degrees, are useful because they may enhance the information content of a scene, e.g., by providing information about the context of an object. Previously known systems have been unable to achieve such wide FOVs.

For example, Taboada describes a technique for imaging the three-dimensional coordinates of a single, distant target and a monotonic polarization ramp. This maps the temporal features of the returned light pulse from the target onto a characteristic intensity range which can be readily measured by a pair of video cameras. While this simple technique is adequate to obtain some depth information on distant objects, several improvements may be made. Embodiments of the present invention provide several areas of improvement over that described by Taboada. These areas may be important, as the inventive systems and methods may be used to record three-dimensional information about several objects within a scene, particularly as the distance from the system and the objects becomes shorter. The embodiments may employ any one, or a combination of any, of these areas of improvement, including the provision of high dynamic range, adaptive depth of field, wide field of view, high resolution, frame-to-frame registration, as well as others.

FIG. 1 illustrates a perspective view of a system 100 for obtaining a three-dimensional, wide FOV image of a scene 190, according to some embodiments of the present invention. Greater detail of methods of obtaining a three dimensional image of a scene using a system such as system 100 are provided below in the section entitled "Methods," and greater detail of the components of a system such as system 100 are provided below in the section entitled "Systems." Although the illustrated embodiment is described with reference to the Cartesian coordinate system, other coordinate systems may be used.

As illustrated in FIG. 1, system 100 includes illumination subsystem 110, sensor subsystem 120, processing subsystem 140, and body 150 in which the various subsystems are mounted. Body 150 may further include a protective cover, not shown. The particular form of system 100 may vary depending on the desired performance parameters and intended application. For example, if system 100 is intended for household use, it will preferably be sufficiently small and light as to be held by a single hand, similar to a camcorder, and may be configured to record relatively close scenes with a modest resolution. Alternatively, if system 100 is intended for surveying a building site, then it may be configured to image large and/or distant scenes with high resolution, and the size of the system will be of secondary consideration.

Illumination subsystem 110 includes a light source, not shown in FIG. 1 but described in greater detail below, and transmission lens 112, which may include a single lens, a compound lens, or a combination of lenses. The light source is configured to generate light pulse 119, which preferably has duration of 2 nanoseconds or less, for example, between 1 nanosecond and 50 picoseconds, depending on the desired resolution in the z-direction. Transmission lens 112 is configured to increase the divergence of pulse 119 to an angle $\phi$ of 1 degrees or greater, for example between 1 and 180 degrees, or between 1 and 120 degrees, or between 2 and 90 degrees, or between 2 and 40 degrees, or between 5 and 40 degrees, and to direct the pulse toward the scene such that the pulse irradiates a portion of scene 190 to be imaged. Objects 191 and 192 in scene 190 are each at different positions in the x-, y-, and z-directions in a Cartesian coordinate system, (or in the r- and $\Theta$-directions in a spherical coordinate system) and also have different shapes. As such, different portions of the laser pulse will travel different distances to irradiate the objects 191, 192, as well as to irradiate different features or areas of each object individually, before the objects scatter and/or reflect the pulse portions 127, 128, 129 back toward system 100. As such, each of pulse portions 127, 128, and 129 will have a different time of flight (TOF). Additionally, the pulse portions 127, 128, 129 have different intensities, depending on the reflectivity of the irradiated feature of each object, and the angle of that feature relative to system 100.

Sensor subsystem 120 includes large-aperture receiving lens 121 that collects reflected pulse portions 127, 128, 129. The appropriate aperture size will depend on the particular application, and may be between, for example, less than 1 cm and 2.5 cm. Other portions of the reflected pulse, e.g., those portions illustrated by dash-dot lines that are reflected in directions other than back toward system 100, may not be captured by receiving optics 121. As for transmission lens 112, receiving lens 121 may include a single lens, a compound lens, or a combination of lenses or other reflective or refractive elements. Receiving optics 121 may also collect broadband or multiband (e.g., visible) information about scene 190, e.g., ambient light that scene 190 scatters or reflects towards receiving optics 121. As such, for this case receiving lens 121 preferably is configured to reduce or eliminate possible aberrations known in the art of optical system design that may degrade image quality for one or more of the bands received. Alternatively, a separate receiving lens may be provided to receive the broadband or multiband light. As described in greater detail below, sensor subsystem may include a separate visible imaging subsystem that records a color or grey-scale image of scene 190 based on visible light collected from the scene. Such an image may later be combined with position and shape information about the scene.

Figure 2:
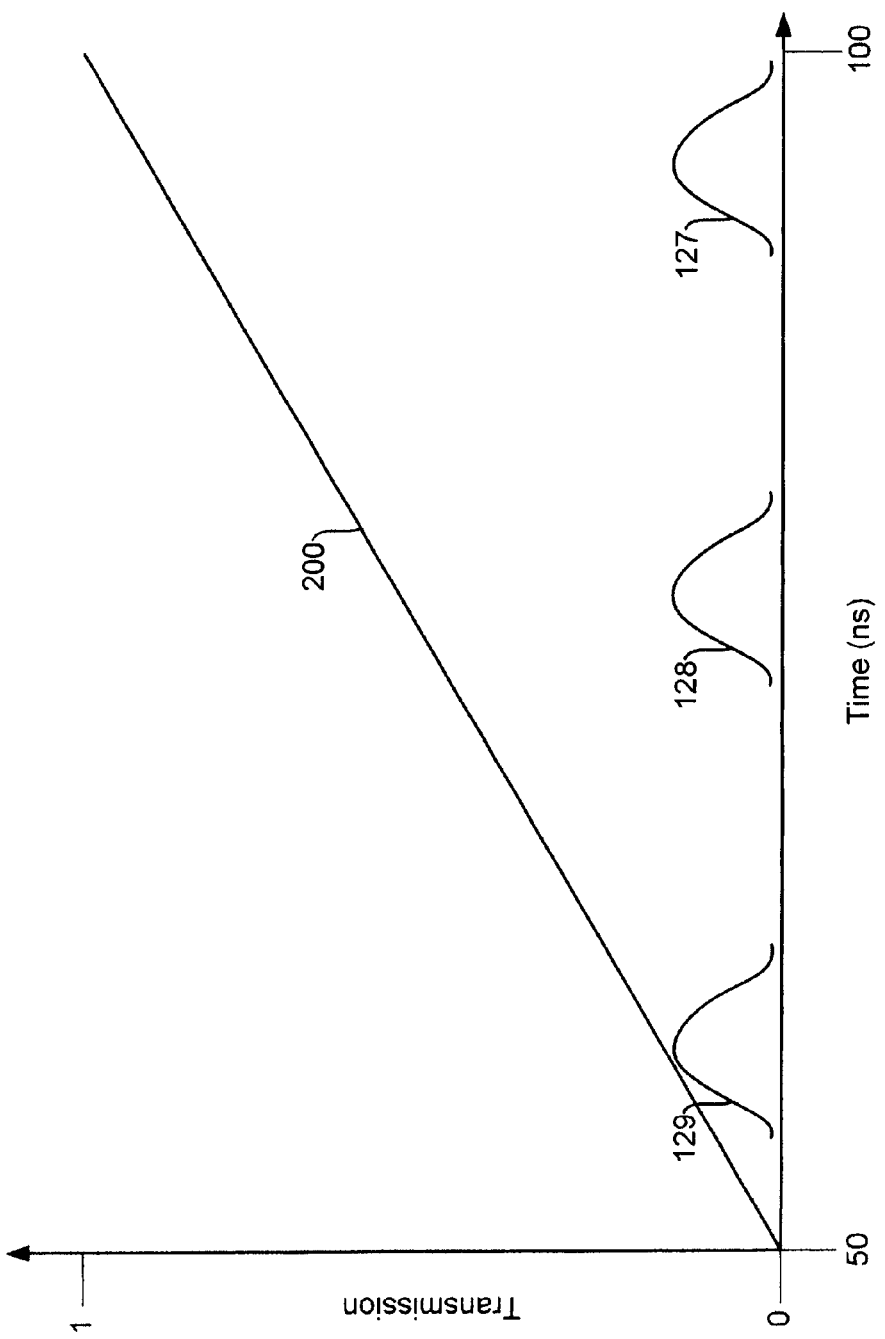
FIG. 2 schematically illustrates the monotonic polarization modulation of light pulse portions reflected from the scene of FIG. 1.

Sensor subsystem 120 creates a plurality of images based on pulse portions 127, 128, 129 that receiving lens 121 collects. These images contain positional information about objects 191, 192 in scene 190. To create such images, sensor subsystem varies the polarization state of the incoming pulse portions 127, 128, 129 as a function of time, e.g., using the wide field of view Pockels assembly described in greater detail below. When followed by an analyzer (e.g. a polarizing element placed after the Pockels cell), the corresponding transmission through the analyzer varies as a function of time. For example, as illustrated in FIG. 2, sensor subsystem 120 may vary the transmission 200 through the analyzer of light collected by receiving lens 121 from zero to one between times of 50 to 100 nanoseconds (where zero nanoseconds corresponds to the time the light pulse was generated). As such, pulse portions 127, 128, and 129, which are delayed in time relative to one another because they traveled different distances to and from objects in scene 190, experience different degrees of transmission than one another. Specifically, pulse portion 129 reflected from a closer portion of object 191 than did pulse portion 128, and so experiences less transmission than pulse portion 128. Pulse portion 127 reflected from further object 192, and so experiences more transmission than pulse portion 128. As such, the extent to which sensor subsystem 120 modulates the transmission of a pulse portion, encodes the TOF of that pulse portion on the intensity received by the FPA, and thus the distance that the pulse portion traveled to and from a particular feature of an object in a scene.

Figure 3:
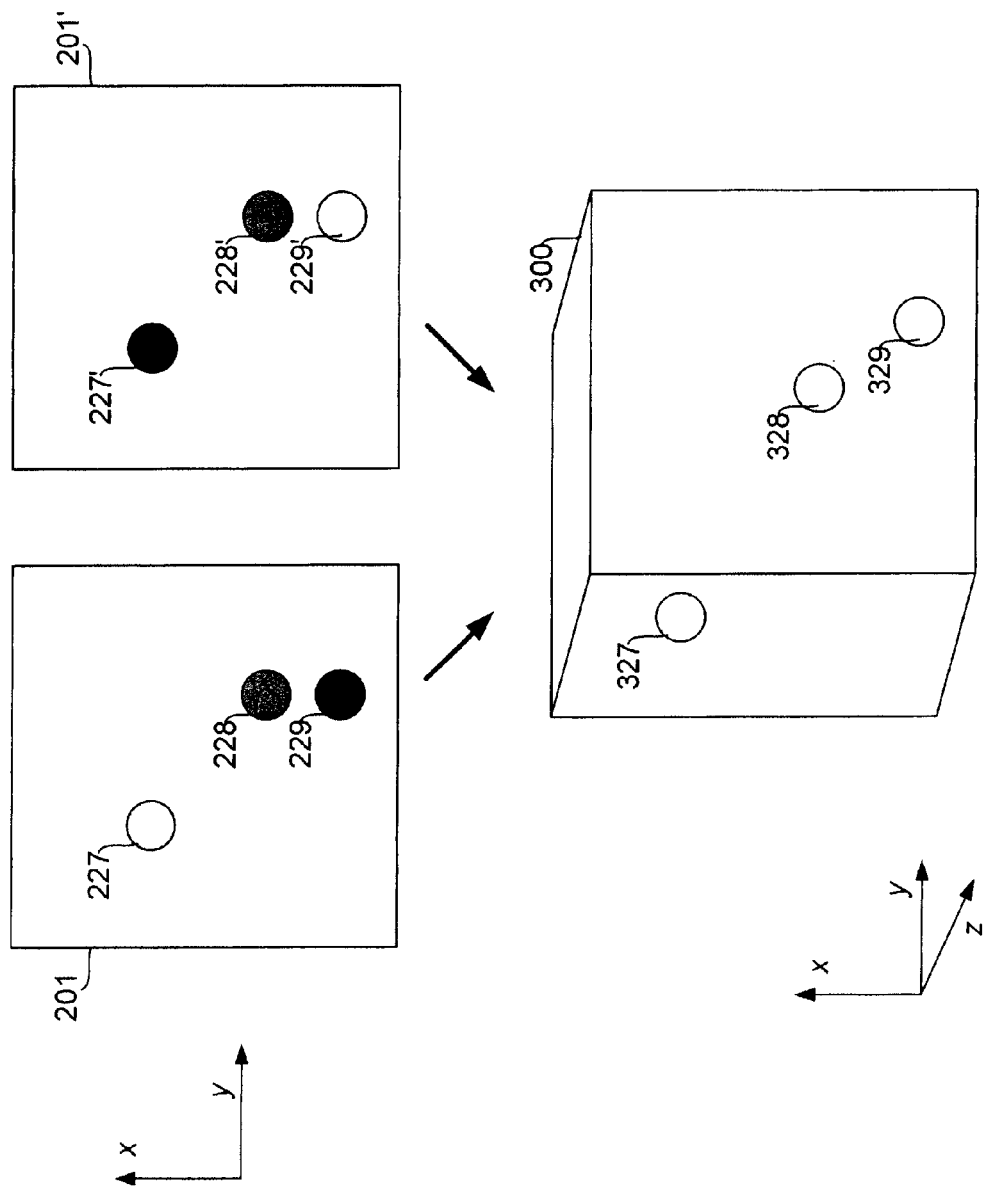
FIG. 3 schematically illustrates two-dimensional and three-dimensional images formed using the modulated light pulse portions from FIG. 2.

Sensor subsystem 120 determines the extent of polarization of each pulse portion 127, 128, 129 by splitting each pulse into its orthogonal polarization components (e.g., H- and V-polarized components) using an optical element such as a prism or polarizing beamsplitter, and then recording complementary images of the two polarization components. For example, as illustrated in FIG. 3, a first image 201 contains information about the H-polarized component of pulse portions 127, 128, 129, in the form of intensity regions 227, 228, 229, respectively. A second image 201' contains information about the V-polarized component of pulse portions 127, 128, 129 in the form of intensity regions 227', 228', 229', respectively. Intensity region 229 in image 201 is significantly darker than intensity region 229' in image 201' because, as illustrated in FIG. 2, pulse portion 129 arrived relatively early and experienced relatively little polarization modulation. Conversely, intensity region 227 in image 201 is significantly darker than intensity region 227 in image 201' because pulse portion 127 arrived relatively late and experienced significant polarization modulation. Intensity regions 228 and 228' are approximately the same intensity, because pulse portion 128 arrived approximately midway through the modulation 200 of the polarization, and thus contained approximately equal amounts of orthogonal polarization components (e.g., H- and V).

Processor subsystem 140, illustrated in FIG. 1, may store images 201, 201' and perform further processing to obtain distance and shape information for objects 191, 192 in scene 190. For example, as described in greater detail below, processor subsystem 140 may normalize images 201, 201' to compensate for variations in reflectance or scattering between objects 191, 192. Processor subsystem 140 may then calculate the positions and shapes of different objects in scene 190 based on the normalized images, forming three-dimensional image 300 illustrated in FIG. 3, which includes distance information about objects 191, 192. Image 300 includes object regions 327, 328, 329 that correspond to pulse portions 127, 128, 129 respectively, and include position and shape information about objects 191 and 192. Further, processor subsystem 140 may combine the calculated distance information with the white light image to provide a three-dimensional image of scene 190 that includes grayscale or color information about the scene, thus mimicking a human view of the scene. Processor subsystem 140 may further control and coordinate the operation of illumination subsystem 110 and sensor subsystem 120, as described in further detail below.

In one illustrative embodiment, system 100 has a range resolution of about 1 mm at a range of 20 meters, and a range resolution of about 3 mm or less at a range of 100 meters. The data acquisition rate may be, for example, between 30-1000 million points per second, significantly faster than possible with scan-based devices. The angular resolution may be, for example, about 0.02 degrees, with a field of view of 30 to 45 degrees. The device may be the size of a "bread box" or smaller, or even in some embodiments the size of a "coffee cup" or smaller, with a cost of less than about $10,000, or even less than $1,000.

Although system 100 is in some respects similar to that disclosed by Taboada, it differs in many material respects. First, Taboada is silent on the dynamic range, distance resolution, and optical resolution of his system, both of which are important to implementing a commercially viable imaging system, particularly one designed to collect information about multiple objects that may be positioned at different ranges within a scene. In contrast, as described in greater detail herein, system 100 may be configured to obtain images of any desired resolution of any aspect of a scene, for example, by extending the dynamic range of the system using any or all of a variety of techniques. Additionally, Taboada's system appears generally to be limited to acquiring a long-range image of a single remote object, e.g., as may be viewed from an aircraft. For example, Taboada discloses the use of a previously known Kerr cell or Pockels cell to modulate the polarization of the reflected light, in particular an arrangement of Pockels cells that are arranged optically in series with one another and electrically in parallel. Previously known Pockels cells may require voltages of anywhere from several thousand to tens of thousands of volts, have a small aperture, e.g., 1 cm or smaller, and have a low acceptance angle, e.g., a small fraction of 1 degree. Taboada's disclosed arrangement of optically serial and electrically parallel Pockels cells would further reduce the clear aperture and the acceptance angle, albeit requiring a lower voltage. Thus, Taboada's system would be unable to obtain accurate distance information using light that diverged by more than some small fraction of 1 degree off of the surface normal of the Pockels cell, let alone 5 degrees or greater. In contrast, as described in greater detail below, system 100 includes a modulator enabling acquisition of high resolution distance information using light that diverges by between 5 and 50 degrees, light scattered from objects distributed throughout a wide field of view, and may require significantly lower voltages, e.g., on the order of tens of volts, or even less than ten volts.

First, an overview of methods for obtaining a three-dimensional image of a scene will be provided. Then, a system for obtaining three-dimensional images will be described in detail. Then, various potential applications of three-dimensional imaging will be described. Lastly, some examples of alternative embodiments will be described. The described methods, systems, applications, and embodiments are intended to be merely exemplary, and not limiting.

2. Methods

Methods for obtaining three dimensional images, according to various embodiments of the present invention, e.g., system 100, will now be described with reference to FIG. 4.

Figure 4:
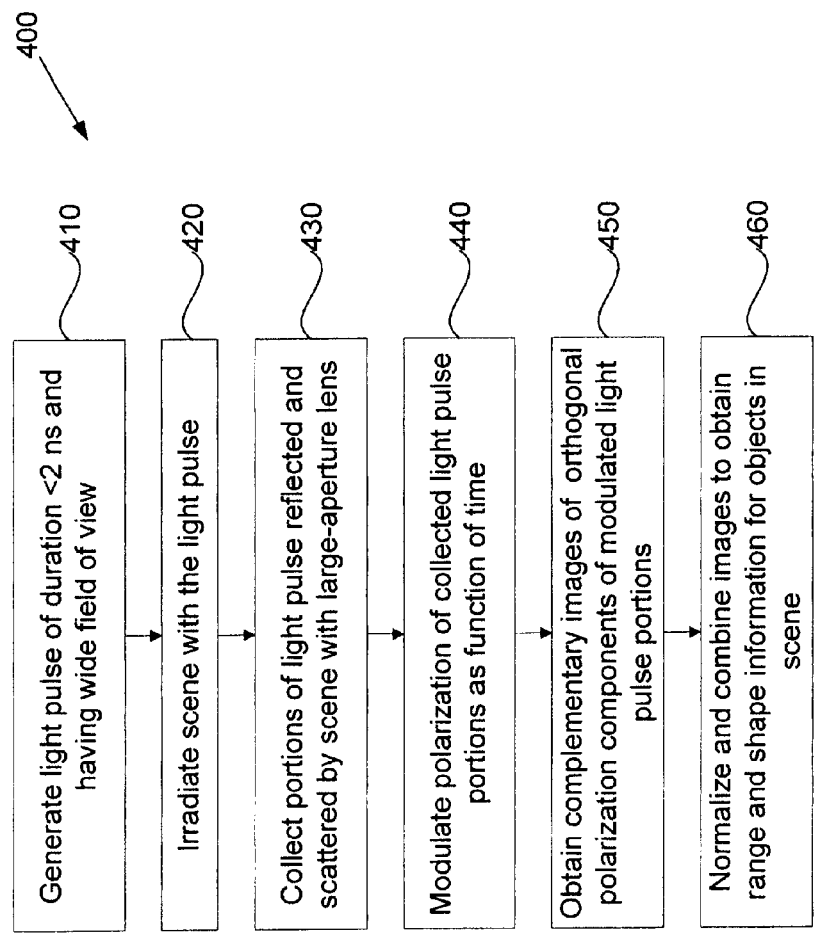
FIG. 4 illustrates an overview of a method of obtaining a three-dimensional image of a scene, according to some embodiments of the present invention.

Method 400 illustrated in FIG. 4 includes generating a light pulse having, for example, a duration of less than 2 nanoseconds and a wide field of view (410), followed by irradiating the scene with such a pulse (420). Such a light pulse may be generated, for example, by one of the illumination subsystems described herein, or any other suitable light pulse generator.

Preferably, the light pulse is spatially uniform. By "spatially uniform," it is meant that the light pulse's spatial intensity, in the x-y plane, varies by less than about 50%, or by less than 40%, or by less than 30%, or by less than 20%, or by less than 10%, or by less than 5%, or by less than 2%, over the majority of the spatial profile of the beam. For example, the pulse may be characterized as having a "full width at half maximum" (FWHM), determined by identifying the maximum intensity of the beam, and identifying the spatial extent of the beam having half that intensity or greater. In some embodiments, the spatial intensity of the pulse varies by less than 50%, or by less than 40%, or by less than 30%, or by less than 20%, or by less than 10%, or by less than 5%, or by less than 2%, over the spatial region characterized by the FWHM. In other embodiments, the spatial intensity profile may vary by greater than 50%, or even by 100%. As described in greater detail below, in some embodiments such a spatially uniform light pulse may be generated with a pulsed laser having a large number of spatial modes, e.g., greater than 20 spatial modes.

The temporal profile of the pulse generated by such a laser may also be substantially smooth, meaning that the pulse's intensity, as a function of time, varies smoothly. As described in greater detail below, in some embodiments such a temporally uniform light pulse may be generated with a pulsed laser having a large number of temporal modes, e.g., greater than 20 temporal modes.

The light pulse may be generated within any suitable portion of the electromagnetic spectrum, e.g., in the visible portion of the spectrum (400 nm-700 nm), or in the near-infrared portion of the spectrum (700 nm-2500 nm), or another range in the electromagnetic spectrum. Preferably, the laser's pulse energy is sufficiently high to provide an acceptable amount of signal to characterize a scene of interest, while at the same time being sufficiently low to be eye-safe for users of the system and any occupants of the scene without the need for special precaution. For example, wavelengths greater than 1400 nm, e.g., between 1400 nm and 2500 nm, may provide an increase of approximately thousand times the maximum permissible exposure limits as compared to visible wavelengths, meaning the scene may be safely irradiated with a thousand times more energy with a pulse having a wavelength greater than 1400 nm than with a pulse having a wavelength in the visible band. Other ways of achieving eye safety include administrative controls, high divergence, and low spatial coherence.

It should be appreciated that the duration and divergence of the light pulse may be selected based on the particular application. For example, a 1 nanosecond pulse may be used to achieve a distance resolution of 0.01 meters, while a 100 picosecond pulse may be used to achieve a distance resolution of 0.001 meters. In various embodiments, the duration of the light pulse may be, for example, between 1 nanosecond and 10 picoseconds, or between 500 picoseconds and 50 picoseconds, or between 200 picoseconds and 100 picoseconds, or between 100 picoseconds and 10 picoseconds, depending on the desired distance resolution. Additionally, the wider the field of view desired for imaging at a particular distance, the larger degree (angle $\phi$ in FIG. 1) of divergence may be selected. For some purposes, a more modest resolution, field of view, and range may be acceptable, while for other purposes, an extremely high resolution, field of view, and range may be desired. As described in greater detail below, the transmission optics may include a manually or automatically controlled zoom lens for adjusting the divergence of the light pulse as needed to irradiate a desired field of view of the particular scene to be imaged.

Method 400 includes collecting portions of the light pulse reflected and scattered by the scene with a large-aperture lens (430). As described above, the light pulse portions carry several types of information about the scene. For example, although the scene is irradiated with a single pulse, the receiving lens receives pulse portions having a variety of TOFs, depending on the relative positions and shapes of different objects or different portions of an object in the scene.

Method 400 also includes modulating the polarization of the collected light pulse portions as a function of time (440). Such modulation may, for example, be a monotonic function of time, as illustrated in FIG. 2. In such an embodiment, pulses with a shorter TOF will experience less polarization modulation than pulses with a longer TOF, enabling distance information to easily be obtained. However, as described in greater detail below, such modulation need not necessarily be monotonic. Additionally, the intensity, rather than the polarization, of the collected light pulse portions, may be modulated.

For embodiments in which the polarization is modulated as a monotonic function of time, the distance information that may be obtained from a particular image of a scene is based, in part, on the temporal duration of that modulation. For example, referring again to FIG. 2, the transmission varies from zero to one over the span of 50 nanoseconds, beginning at 50 nanoseconds. As such, only pulse portions arriving during that 50 nanosecond modulation window (corresponding to a range window of 7.5 meters) will experience a transmission between zero and one. Pulse portions that reflect from objects closer than 7.5 meters, and thus arrive before the modulation window begins at 50 nanoseconds, or that reflect from objects further than 30 meters, and thus arrive after the modulation window has closed, will have longer or shorter TOFs, and so will not be modulated by the particular waveform in FIG. 2. To access other range windows, the start time and/or the temporal duration of the polarization modulation may be varied appropriately. In one embodiment, method 400 is repeated using a variety of temporal durations and/or start times for the polarization modulation, and the resulting images combined to form a three-dimensional image having significantly greater distance information than could be obtained using a single polarization modulation.

Method 400 also includes obtaining complementary images of the orthogonal polarization components (e.g., the H- and V-polarization components, or left and right circularly polarized components) of the modulated pulse portions (450). In one embodiment, such images are obtained by dividing the pulse portions into their orthogonal components using a polarizing beamsplitter, and imaging the orthogonal components onto respective focal plane arrays (FPAs). The FPAs may be adapted to have a high sensitivity at or near the central wavelength of the light pulse generated at step 410. Where the light pulse is in the visible band (e.g., 400 to 700 nm), a commercially available CCD or CMOS-based array may be suitable, whereas if the light pulse is in the near-infrared band (e.g., 700 nm to 2500 nm), other array technology or materials may be required.

Method 400 also includes normalizing and combining the complementary images from step 450 to obtain distance and shape information for objects in the scene (460). Such processing may be done on a pixel-by-pixel basis, as described in greater detail below.

The range resolution obtainable via such a method, or by a system configured to implement such a method, e.g., system 500 discussed below with reference to FIG. 5, may be based in part on the length of the modulation waveform combined with the uncertainty involved in measuring the irradiance and timing of that waveform. The uncertainty in the irradiance measurement is related to the signal-to-noise ratio (SNR). For long-range applications such as disclosed by Taboada, the number of photons received from a target is limited because of the long distances, as the signal falls off as $1/R^2$, where R is the distance to the target. The dominant noise terms are then related to the dark current, readout noise, and background light (e.g., sunlight). For such applications, the use of very low noise imaging arrays may be crucial. In contrast, according to various embodiments of the current invention, operating at much closer ranges means that it is practical to design the illumination subsystem, e.g., a laser, so as to provide sufficient illuminating irradiance to provide a high SNR. For such an operating mode, the dominant noise term may be the shot noise of the return signal, which goes as the square root of the received signal. The focal plane array may then be selected to be one with high dynamic range (which may be defined in terms of the maximum signal that may be measured divided by the intrinsic noise levels of the array). Because the shot noise level, instead of the intrinsic noise level, is the limiting term, one useful feature of the focal plane array may include the presence of deep wells (corresponding to a high saturation level). For example, well depths of 100,000 electrons or greater may provide an SNR of about 300 or greater, so long as the intrinsic noise levels are approximately 100 electrons or less. Additionally, whereas applications such as disclosed by Taboada may require focal plane arrays configured to minimize intrinsic noise, such arrays may require special designs limiting the number of pixels or increasing the cost, which may reduce the practical performance of the system.

3. System

Figure 5:
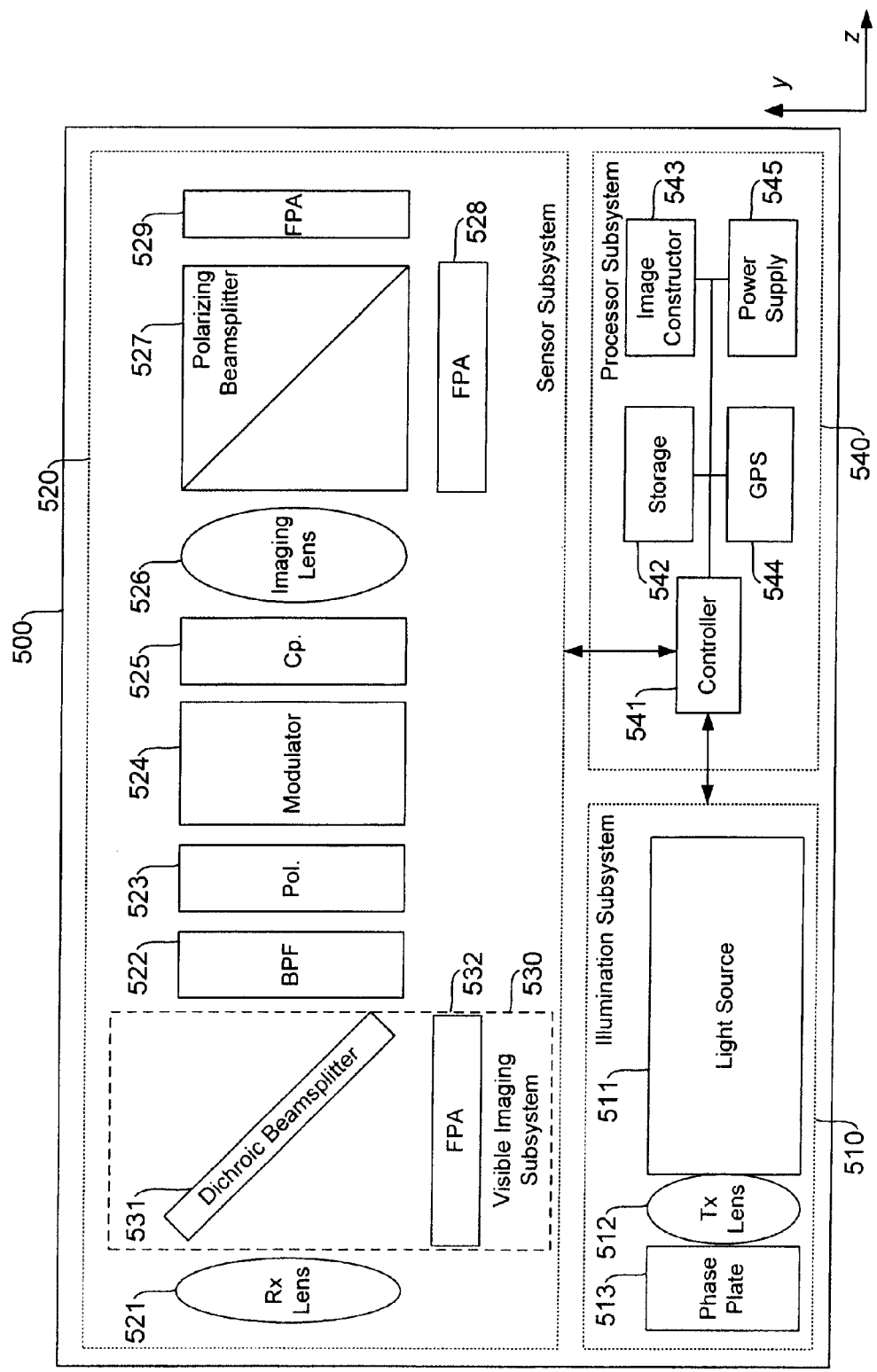
FIG. 5 schematically illustrates components in the system of FIG. 1, according to some embodiments of the present invention.

FIG. 5 schematically illustrates selected components in a three-dimensional imaging system 500, according to some embodiments of the present invention. It should be appreciated that the functionality of system 500 may alternatively be provided with other optical arrangements, for example as described below. As illustrated in FIG. 5, system 500 includes illumination subsystem 510, sensor subsystem 520, and processor subsystem 540. Each of these subsystems will now be described in greater detail.

A. Illumination Subsystem 510

Illumination subsystem 510 includes light source 511 for generating a light pulse, transmission (Tx) lens 512 for controlling the divergence of the generated light pulse, and optional phase plate or other beamshaping element 513 for enhancing the spatial profile of the light pulse. The positions of lens 512 and optional phase plate 513 may alternatively be reversed. These elements may also be combined in a single optic or set of optics. Illumination subsystem 510 is in operable communication with controller 541, which may control and/or monitor the emission of light pulses from light source 511, and which further may control and/or monitor the divergence that transmission lens 512 imparts on the generated light pulse.

As noted above, with reference to FIG. 1, the illumination subsystem preferably generates a light pulse having a smooth spatial profile, a smooth temporal profile, and a divergence of between, for example, 5 and 40 degrees. The light pulse may be in any suitable portion of the electromagnetic spectrum, for example, in the visible band (e.g., 400-700 nm) or in the near-infrared band (e.g., 700 nm-2500 nm). Generally, pulses generated in specific regions of the near-infrared band are considered to be more "eye-safe" than pulses of comparable power in the visible band. Light source 511 is configured to generate a light pulse in the desired electromagnetic band, and lens 512 and optional phase plate 513 are configured to provide that light pulse with the desired divergence and optionally further to enhance the pulse's spatial profile. In some embodiments, light source 511 is a laser producing light pulses having at least 5 µJ energy, or at least 100 µJ energy, or at least 1 mJ energy, or at least 10 mJ energy. Such laser energies may be relatively eye-safe because of the high divergence of the laser beam.

First, a brief description of some issues associated with previously known lasers will be provided. Then, a description of a low-coherence laser that may be used as light source 511 will be provided.

One of the unique features of a laser beam is its ability to be focused to a small diameter, and, relatedly, to propagate for long distances without appreciably changing in diameter. Since the invention of the laser in the early 1960's, significant work has been done to improve the performance of laser devices in these respects, particularly to be able to focus the laser to the diffraction limit. Some of such efforts have focused on increasing the spatial and temporal coherence of the laser beam, for example, by limiting the number of spatial and temporal modes of the laser by carefully designing the laser cavity, providing cavity mirrors of optimum curvature, by placing small apertures at particular locations within the laser cavity to inhibit lasing of higher order modes, and/or controlling aberration-inducing effects such as thermal lensing. Other devices and techniques may also be used to improve the beam characteristics.

A technique for improving the efficiency of a laser that outputs energy primarily in the fundamental mode is to match the diameter of the gain volume to the diameter of the laser cavity mode volume. The mode diameter is determined by the radii of curvature of the cavity mirrors and the separation of these mirrors. For stable resonator cavities, this diameter is typically small. This limits the total energy that may be extracted from the laser for each pulse because of gain saturation effects. Unstable resonator designs may be used to increase the intracavity mode size for the fundamental spatial mode so that larger gain volumes may be used while still only exciting the fundamental spatial mode. However, high gain laser media are required to overcome the high losses intrinsic in unstable cavities, and diffraction effects from the cavity mirrors cause significant modulation in the output spatial profile. Outside of a laser cavity, deformable mirrors and phase correctors may be used to correct aberrations that may reduce the focusability of the laser beam.

The use of such techniques in laser design may cause trade-offs in other characteristics of the laser device. For example, design output power or energy may be reduced during attempts to reduce the effects of thermal distortions, gain saturation effects, the effects of higher order transverse modes, and the like. Design choices to improve the spatial coherence of the beam, e.g., to eliminate higher order modes, may also lead to the use of more expensive mirrors and optical designs. Such design considerations may increase system cost and complexity.

However, there are many applications in fields such as laser imaging where the focusability of the laser beam is not important. Indeed, additional optical elements may be introduced to expand the laser beam to fill an area of interest. The spatial and temporal coherence of the laser beam may, in such applications, cause "speckle," in which the laser beam interferes with itself, causing undesirable intensity variations across the laser spot on the target. For some laser imaging applications, it may be desirable to reduce the spatial and temporal coherence of the laser beam, so that the laser instead functions primarily as a monochromatic, well-controlled, uniform "flashlight." The criteria for producing a laser configured for such a low-coherence application may be significantly different than those for a diffraction-limited beam. For example, a low-coherence laser may be configured to provide high output power or energy for a relatively low cost, both for pulsed and continuous wave (CW) laser devices. Lower spatial coherence may also reduce the focusability of the laser on the retina of the eye, thereby improving eye safety.

Referring again to FIG. 5, three-dimensional imaging system is one non-limiting example of a wide field-of-view system in which reduced spatial and/or temporal coherence may be useful. Illumination subsystem 510 may generate a laser pulse having a large divergence, e.g., between 1 and 180, or between 1 and 90, or between 1 and 40, or between 2 and 40, or between 5 and 40 degrees of divergence, and low spatial and/or temporal coherence, whereas a diffraction-limited laser may have a divergence of only a fraction of a degree and a large amount of spatial and temporal coherence. The large divergence and lack of spatial and/or temporal coherence may reduce the amount of intensity fluctuations in the laser irradiance at the surfaces of objects being illuminated with the laser beam. The smoother intensity profile of the laser beam generated by illumination subsystem 510 may improve the performance of sensor subsystem 520.

Figure 6A:
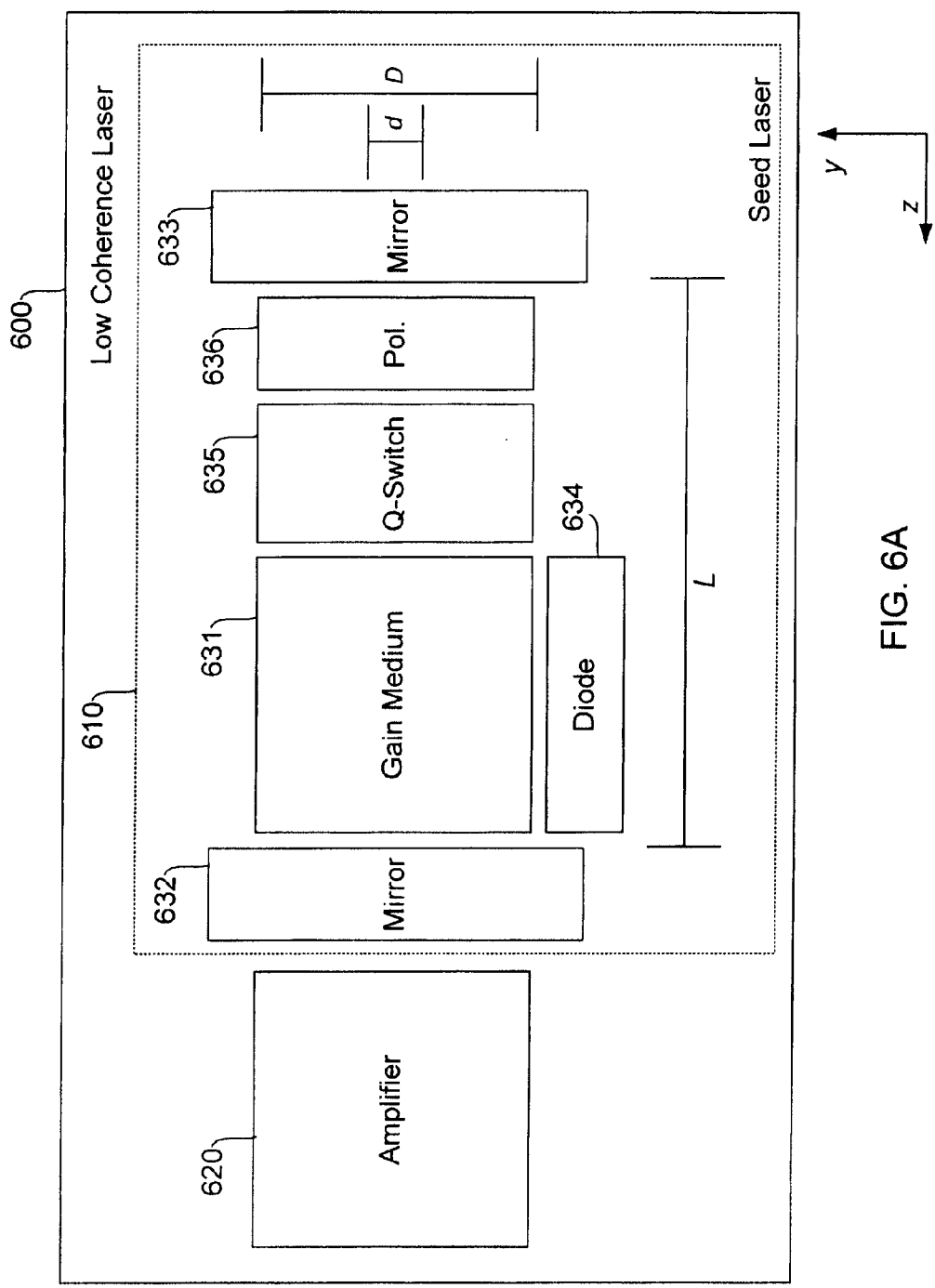
FIG. 6A illustrates a light source for generating spatially uniform light pulses having duration of less than 1 nanosecond, according to some embodiments of the present invention.

FIG. 6A schematically illustrates one embodiment of a low-coherence laser 600 suitable for use as light source 511 of FIG. 5. Laser 600 includes seed laser 610, which generates light pulses, and optionally further includes amplifier 620, which may include one or more stages for amplifying the intensity of the light pulses generated by seed laser 610. Laser 600 may operate under the control of controller 541 illustrated in FIG. 5. It should be noted that laser 600 may alternatively be a standalone system (that is, not included in system 500), in which case it may include its own laser controller.

Referring to FIG. 6A, seed laser 610 includes gain medium 631, first and second cavity mirrors 632, 633, diode or other pump 634, optional Q-switch 635, and optional polarizer 636. Cavity mirror 633 preferably is a high reflector, while cavity mirror 623 is partially transmissive to allow laser light out of the laser and into optional amplifier 620 or onto the scene. At least one of cavity mirrors 632, 633 optionally may be coated directly onto gain medium 631, obviating the need for a separate optical component. Active Q-switch 635 and polarizer 636 may be configured to hold off lasing within the cavity until a desired time, e.g., until a time at which it is desired to obtain a laser pulse from seed laser 610. Although many embodiments described herein pertain to seed laser 610 being configured to generate laser pulses, seed laser 610 alternatively may be configured to generate a continuous-wave (CW) laser beam.

Figure 6C:
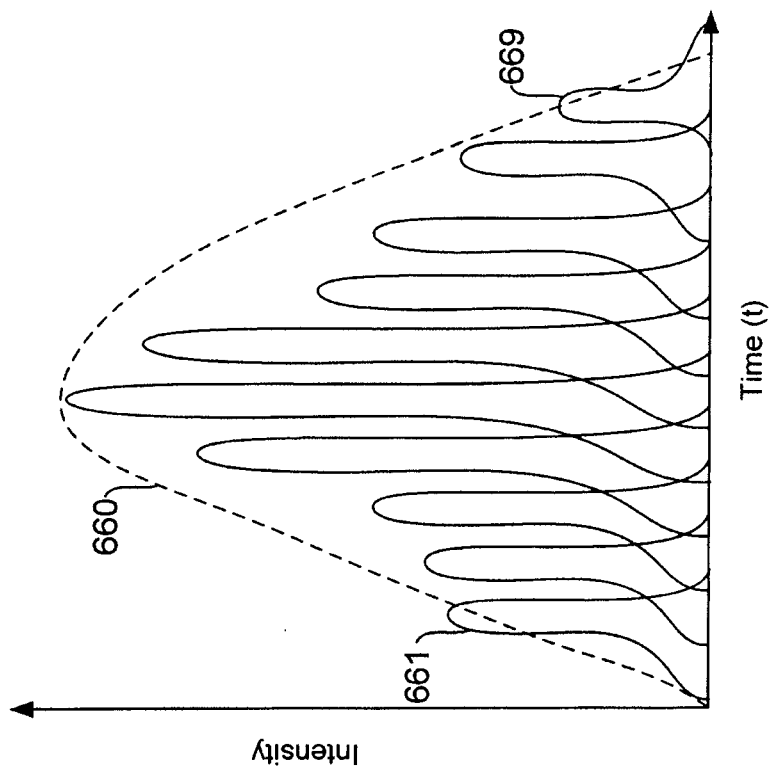
FIGS. 6B-6C schematically illustrate spatial and temporal mode structures of the light source of FIG. 6A, according to one embodiment of the present invention.
Figure 6B:
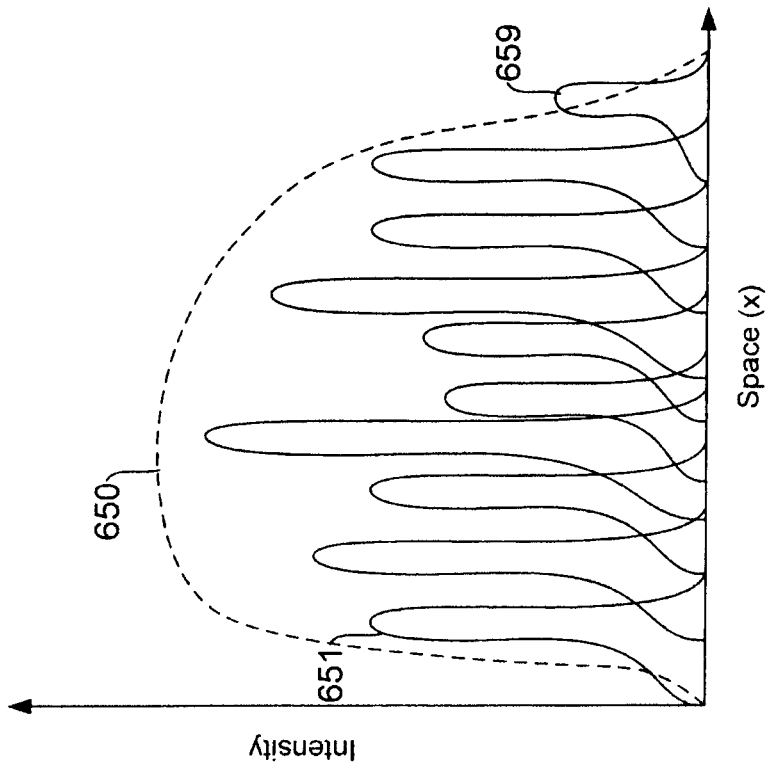

In some embodiments, seed laser 610 preferably generates a laser pulse of 1 nanosecond or shorter, and including a sufficient number of spatial modes to provide a substantially uniform spatial profile. The meaning of "substantially uniform" temporal and spatial profile is provided above. Additionally, the presence of many spatial modes may also increase the total number of longitudinal modes present in the laser beam. For example, as illustrated in FIGS. 6B-6C, the laser pulse generated by seed laser 610 preferably includes a sufficient number of spatial modes 651, . . . 659 that when such spatial modes may interfere with one another, the result is a substantially smooth overall spatial profile 650, as well as a sufficient number of temporal modes (which may be related to the spatial modes) 661, . . . 669 that such temporal modes may interfere with one another so as to provide a substantially smooth overall temporal profile 660. In some embodiments, seed laser 610 generates a laser pulse having at least 10 spatial modes, or at least 20 spatial modes, or at least 30 spatial modes, or at least 40 spatial modes, or at least 50 spatial modes, or at least 100 spatial modes, e.g., any number that may provide a smooth spatial profile. In some embodiments, seed laser 610 generates a laser pulse having at least 10 temporal modes, or at least 20 temporal modes, or at least 30 temporal modes, or at least 40 temporal modes, or at least 50 temporal modes, or at least 100 temporal modes, e.g., any number that may provide a smooth temporal profile. In other embodiments, seed laser 610 includes only a few modes, e.g., between 2 and 10 spatial and/or temporal modes.

Referring again to FIG. 6A, gain medium 631 may be selected, based on the desired operating wavelength of laser 600, from any of a variety of gain media known in the art or yet to be discovered. For example, as described in greater detail below, gain medium 631 may include a large-core active fiber (fiber with active laser dopant in the core). Or, for example, gain medium 631 may include a solid-state material such as Nd:YAG, Er:YAG, Cr:YAG, Ti:Sapphire, or Tm, Ho:YAG, among others. Alternatively, gain medium 631 may include a semiconductor material such as InGaAs, and seed laser 611 is a pulsed diode laser that requires no separate optical pump for exciting the gain medium.

Diode 634, or any other suitable pump for exciting gain medium 631, is configured to excite gain medium 631 so as to induce lasing within the resonant cavity bounded by mirrors 632, 633 and having length L. The low spatial coherence of the laser beam is achieved by designing seed laser 610 so as to support a large number of spatial modes within the resonant cavity. For example, the gain diameter D may be made significantly larger than the fundamental mode diameter d. Higher order modes have a larger diameter than the fundamental mode, so the larger gain diameter D supports many spatial modes simultaneously. Additionally, or alternatively, the curvatures of mirrors 632, 633 may be chosen to reduce or minimize the difference in loss between the higher order modes and the fundamental modes. This may also be described as configuring the cavity so as to increase its Fresnel number. It is known that resonator cavities using planar mirrors or nearly planar mirrors are less effective in discriminating higher order modes. As such, one or both of mirrors 632, 633 may be planar, or nearly planar. For example, in one embodiment mirror 632 (or 633) is planar, and mirror 633 (or 632) is concave with a radius of curvature greater than 1 meter.

Additionally, or alternatively, the cavity length L, i.e., the separation between mirrors 632, 633 may be decreased. The minimum cavity length is the minimum distance that will contain all of the required components within the resonator cavity. If the cavity is configured such that the single pass gain is made significantly higher than the losses associated with the higher-order spatial modes, for example, the single pass gain is greater than 3, lasing may occur across the entire gain diameter D and the beam exiting the laser resonator will have a spatial profile that reflects the spatial profile of the gain distribution. Preferably, the beam will include a sufficient number of spatial modes that the overall spatial intensity profile of the beam will be substantially smooth. The relatively small separation L between mirrors 632, 633 and the relatively large gain diameter D may enable seed laser 610 to be fabricated compactly, with reduced complexity of coupling optics for the pump source, and simplified mechanical design, which may result in enhanced stability. All of such aspects may result in a laser having lower cost and greater effectiveness for laser imaging applications and devices as compared to single-mode or other traditional laser designs.

In some embodiments, seed laser 601 is configured such that the spatial profile of the gain distribution is approximately uniform in the direction transverse to the optical axis of the laser resonator (the z-direction in FIG. 6A). Such a configuration may provide a laser pulse having a substantially flat spatial profile and containing numerous spatial modes. In other embodiments, seed laser 601 is configured such that the spatial profile of the gain distribution is adjusted to increase the number of higher order modes in the laser beam. For example, if the fundamental mode is preferentially located near the center of the gain distribution, the gain profile may be adjusted to reduce the gain at the center, where the fundamental mode is located. Such an adjustment may be made, for example, by reducing the reflectivity of mirror 632 or 633 near the center of the cavity, or by providing an additional optical element within the cavity that is configured to absorb a small amount of energy near the center of the cavity. Reducing the gain near the center of the cavity may decrease the amount of energy available to the fundamental mode and/or other lower order modes, and thereby increase the amount of energy available to the higher order modes. The presence of many spatial modes may also increase the total number of longitudinal modes present in the laser beam.

Additionally, or alternatively, an optic such as a phase plate, optionally may be included the cavity of seed laser 610. Such an optic may decrease the discrimination between the spatial resonator modes, as well as increase the coupling of energy transfer between modes as the energy builds up within the resonator cavity. Such an optic may also be used to increase the loss associated with the fundamental mode. Such an optic may be provided as a separate optical component, or may be provided as a coating on one or both of mirrors 632, 633.

The temporal coherence of the beam may also be decreased by maximizing the beam's spectral bandwidth. For example, some or all of the above-noted techniques for increasing the number of spatial modes may also increase the bandwidth of the laser light. Or, for example, decreasing the pulse length $\tau_p$ may also increase the spectral bandwidth $\Delta\lambda$ because the two quantities are related by the following equation:

$$\Delta\lambda \geq \frac{\tau_p c}{K} \quad (2)$$

where K is a constant of order unity that varies with the spectral and pulse temporal shape and c is the speed of light.

As noted above, seed laser 610 optionally also includes Q-switch 635 and polarizer 636. The pulse length $\tau_p$ for an optimized laser pulse from a resonant cavity including a Q-switch may be described by:

$$\tau_p = \frac{2L}{\delta}\left(\frac{\ln z}{z(1-a(1-\ln a))}\right), \text{ where} \quad (3)$$

$$z = \frac{\ln G^2}{\delta}, \text{ where} \quad (4)$$

$$a = \frac{z-1}{z \ln z} \quad (5)$$

and where δ is the resonator loss and G is the single pass gain. This formula often is only an approximation of the operation of a Q-switched laser device, but it serves to illustrate some of the parameters that affect the laser pulse length. As noted above, the pulse length of the laser pulse generated by seed laser 610 is decreased by reducing the separation L between mirrors 632, 633. In some embodiments, seed laser 601 may be configured such that the separation L is sufficiently large that the spectral spacing Δν=c/2 L between the longitudinal cavity modes is less than the emission spectral bandwidth of the gain material. In other words, the cavity length L is configured so as to be long enough to support multiple longitudinal modes.

In other embodiments, the pulse length $\tau_p$ may be decreased by decreasing the reflectivity of mirror 632, and/or by increasing the single pass gain in the resonator cavity, which may increase the number of longitudinal and spatial cavity modes.

Although Q-switch 635 is described above as being active, alternatively it may be of passive design, e.g., using a saturable absorber or other material with variable transmission, and polarizer 636 may be omitted. The laser pulse length for such a configuration may be similar to that described above for an active Q-switch. In another embodiment (not illustrated), seed laser 610 is configured so as to have a cavity-dumped design in which mirrors 632, 633 are both high reflectors, and seed laser 610 further includes a fast optical switch configured to "dump" the laser pulse out of the cavity after the pulse reaches a sufficient power. In yet another embodiment, seed laser 610 includes an active or a passive mode-locker that generates a sequence of pulses. The sequence of pulses may all be used to illuminate the scene, or a single pulse may be selected, e.g., using a fast optical switch. As noted above, however, laser 600 may be used in any other suitable system, or as a standalone device, and is not limited to use with the three-dimensional imaging systems provided herein. The pulse generated by seed laser 610 optionally may be amplified via amplifier 620. Amplifier 620 may have any suitable design and may be selected from a variety of amplifiers known in the art, or yet to be invented.

Some embodiments use a fiber waveguide or photonic band gap material for gain medium 631. Some fiber lasers or fiber amplifiers are limited to approximately 1 MW peak power because of the risk of nonlinear damage effects. Fiber cores that transport the laser light may be 6-20 μm in diameter, with traditional designs focused on limiting the spatial mode content of the beam. The maximum energy typically achievable with fiber lasers is limited to about 1 mJ or less because of the onset of nonlinear effects at high intensities within the fiber core. In one embodiment, gain medium 631 includes a fiber having a core that is 200 μm in diameter, with a length and coupling chosen to improve the coupling between all of the guided modes and filling the core. Such a medium may be up to 100 times larger than a typical fiber core, which may allow the peak power from the fiber laser to be up to 100 MW without the risk of nonlinear damage effects or adverse distortion effects. Other embodiments use other core diameters that increase the allowable peak power in the fiber relative to typical fibers, for example, between 50 and 500 μm, or between 100 and 400 μm, or between 150 and 250 μm. In such fiber-based embodiments, the relatively large core diameter may also provide a greater number of spatial modes and decrease the spatial coherence of the output laser beam.

Such fiber-based embodiments may include both fiber-based resonators as well as pulsed laser designs in which the laser pulse is produced by a laser oscillator that may or may not be fiber-based. In the latter case, the laser pulse may be amplified in one or more amplifier stages 620 with couplers and isolators between the stages. Each of these stages may include an active core fiber (fiber with an active laser dopant in the core) and the core initially may be small, increasing with increased amplifier energy, or the core may be large in all of the amplifier stages 620. In a different embodiment, laser 600 is based on fiber technology, which may enable higher overall gain to be obtained from a relatively low-gain gain medium 630, while providing robust operation based on mature 1500 nanometer fiber technology. For example, in one embodiment seed laser 610 may include a fiber having a diameter of 200 μm and may generate pulses having a wavelength of 1500 nm, a pulse duration of 500 picoseconds, and an energy of approximately 1 nJ. Amplifier 620 may include a three-stage fiber-based amplifier to amplify the pulse to an energy of 0.5 mJ, followed by a very large core amplifier to amplify the pulse to an energy of 40 mJ or greater. In another embodiment, seed laser 610 includes a pulsed diode and amplifier 620 may include a fiber-based amplifier.

In some embodiments, low coherence laser 600 generates pulses having a wavelength of 1400 nm or greater, an energy of 40 mJ or greater, and a pulse duration of less than 500 picoseconds. There are several gain media 631 that emit in this spectral region, including Er:YAG, Cr:YAG, and Tm, Ho:YAG. For example, the material Er:YAG has been used to produce pulses at 1617 nm having 1 nanosecond pulse lengths and 0.6 mJ output at 10 kHz pulse repetition frequencies. However, Er:YAG offers relatively low gain, making it difficult to scale to higher pulse energies for even shorter pulse lengths, e.g., 500 picoseconds or shorter. The other listed materials may have similar constraints. As noted above, laser 600 may include amplifier 620 to amplify the seed pulse energy generated by seed laser 610. For example, amplifier 620 may include an optical parametric amplifier (OPA) to amplify light in this spectral region (1400 nm or greater) using an Nd:YAG pump. However, OPAs are typically 30-40% efficient, and so in some embodiments amplifier 620 is configured to generate pump pulses of 100 mJ or greater to amplify the pulse energy generated by seed laser 610. Those of ordinary skill in the art may readily devise other ways of amplifying the energy generated by seed laser 610.

Referring again to FIG. 5, transmission (Tx) lens 512 may increase the divergence of the light pulse generated by light source 511 (e.g., low coherence laser 600 of FIG. 6A, or any other suitable laser, including in one embodiment a high coherence laser). For example, although the light pulse from light source 511 may in some embodiments be relatively highly divergent compared to previously known lasers because the pulse contains many spatially and temporally incoherent modes, the pulse's divergence may in some circumstances still remain well below 1 degree. Lens 512 may be configured to increase the divergence of the light pulse to between 5 and 40 degrees, depending on the distance of the scene from system 500 and the portion thereof to be imaged. Lens 512 may include a single lens, or may include a compound lens, or may include a plurality of lenses or mirrors, that is/are configured to increase the divergence of the pulse to the desired degree, e.g., to between 1 and 180 degrees, or 1 and 120 degrees, or 1 and 90 degrees, or 2 and 90 degrees, or 2 and 40 degrees, 5 and 40 degrees, or between 5 and 30 degrees, or between 5 and 20 degrees, or between 5 and 10 degrees, or between 10 and 40 degrees, or between 20 and 40 degrees, or between 30 and 40 degrees, or between 10 and 30 degrees, for example. Divergences larger or smaller may also be used. In some embodiments, transmission lens 512 may be adjustable, so that a user may vary the divergence of the laser pulse to suit the particular situation. Such an adjustment may be manual (similar to the manual adjustment of a "zoom" lens), or may be automated. For example, controller 541 may be operably connected to transmission lens 512 so as to automatically control the degree of divergence that lens 512 imparts to the laser pulse. Such automatic control may be responsive to user input, or may be part of an automated scene-imaging sequence, as described in greater detail below.

Illumination subsystem 510 optionally may further include phase plate 513, which is configured to further smooth the spatial profile of the light pulse generated by light source 511.

It should be noted that although illumination subsystem 510 includes light source 511, which is substantially monochromatic, it optionally may include additional types of light sources. For example, illumination subsystem 510 may include a white light source for illuminating the scene with white light. Or, for example, illumination subsystem 510 may include other substantially monochromatic light sources in spectral regions different from that emitted by light source 511. For example, where light source 511 generates laser pulses in one particular portion of the visible spectrum, such as in the green region, e.g., 532 nm, such pulses may cast that hue over the scene. In some circumstances, such as the filming of a movie, this may be undesirable. Illumination subsystem 510 may include one or more additional light sources that generate light that, when combined with the light from light source 511, result in the appearance of white light. For example, where light source 511 generates green laser pulses (e.g., 532 nm), illumination subsystem 510 optionally may further include diodes or lasers or other light sources that emit wavelengths in the red and blue regions, e.g., 620 nm and 470 nm, that, combined with the green laser pulses to produce an illumination that maintains the desired scene illumination characteristics.

B. Sensor Subsystem 520

Still referring to FIG. 5, system 500 further includes sensor subsystem 520, which receives portions of the light pulse, generated by illumination subsystem 510, that are reflected and/or scattered by objects in the scene. Optionally, sensor subsystem 520 also receives visible light from the scene, which light may be from ambient sources and/or may be produced by a separate light source in illumination subsystem 510. In the embodiment illustrated in FIG. 5, sensor subsystem includes receiving (Rx) lens 521, band-pass filter (BPF) 522, polarizer (Pol.) 523, modulator 524, optional compensator (Cp.) 525, imaging lens 526, polarizing beamsplitter 527, and first and second FPAs 528, 529. Sensor subsystem optionally further includes white light imaging subsystem 530, which includes dichroic beamsplitter 531 and FPA 532. Sensor subsystem 520 is in operable communication with controller 541, which may monitor and/or control the operation of different components of the sensor subsystem, such as receiving lens 521, modulator 524, imaging lens 526, FPAs 528, 529, and optional FPA 532.

Receiving lens 521 collects light from the scene. As discussed above with reference to FIG. 1, the scene may scatter and/or reflect light in a variety of directions other than back toward the three-dimensional imaging system. Some of such light was generated by illumination subsystem 510, while other of such light may be white light or light in a different wavelength range, which may or may not have been generated by illumination subsystem 510. The amount of light collected is proportional to the area of the receiving aperture, e.g., is proportional to the area of receiving lens 521.

To enhance the amount of light collected by sensor subsystem 520, thus increasing the amount of information that ultimately may be contained in each three-dimensional image, receiving lens 521 is constructed to receive as much light as practicable for the given application. For example, for some applications in which the imaging system is designed to be lightweight and hand-held, with modest resolution requirements, receiving lens 521 may, for example, have a diameter of 1 to 4 inches, or 2 to 3 inches, or for example, about 2 inches, or smaller. For applications in which the imaging system is instead designed to provide high-resolution images for commercial purposes, receiving lens 521 may be made as large as practicably feasible, for example, having a diameter of 2 to 6 inches, or 2 to 4 inches, or 1 to 3 inches, or, for example, 4 inches. The various optical components of sensor subsystem 520 preferably are configured so as to avoid clipping or vignetting the light collected by receiving lens 521 using techniques known in optical design. Additionally, receiving lens 521 and the other optical components or coatings preferably also have a wide angular acceptance, e.g., of between 1 and 180 degrees, or between 1 and 120 degrees, or between 1 and 90 degrees, or between 2 and 40 degrees, or between 5 and 40 degrees.

Receiving lens 521 may include a single lens, or may include a compound lens, or may include a plurality of lenses or mirrors, that is/are configured to collect light from the scene and to image the collected light into an image plane at a defined position within sensor subsystem 520. Receiving lens 521 preferably is configured to reduce or inhibit the introduction of spherical and chromatic aberrations onto the collected light. In some embodiments, receiving lens 521 may be adjustable, so that a user may choose to adjust the position of the object plane of lens 521, or the distance at which the scene is imaged to the defined plan within sensor subsystem 520. In some embodiments, receiving lens 521 can be adjusted to change the angular FOV. Such an adjustment may be manual (similar to the manual adjustment of a "zoom" lens), or may be automated. For example, controller 541 may be operably connected to receiving lens 521 so as to automatically control the position of the object plane of lens 521 or angular FOV of lens 521. In some embodiments, these adjustments may be performed in part based on the beam divergence imparted by transmission lens 512 (which also may be controlled by controller 541). Such automatic control may be responsive to user input, or may be part of an automated scene-imaging sequence, as described in greater detail below.

In the embodiment illustrated in FIG. 5, sensor subsystem 520 includes visible imaging subsystem 530, so the light collected by receiving lens 521 is imaged at two image planes. Specifically, the collected light passes through dichroic beamsplitter 531, which is configured to redirect at least a portion of the collected visible light onto FPA 532, which is positioned in the image plane of receiving lens 521. FPA 532 is configured to record a color or grey-scale image of the scene based on the visible light it receives, e.g., using previously known hardware and techniques. In some embodiments, FPA 532 is substantially identical to first and second FPAs 528, 529, and is configured so that the visible light image it records is registered with the images that the first and second FPAs record. FPA 532 is in operable communication with controller 541, which obtains the image from FPA 532 and provides the obtained image to storage 542 for storage, which may be accessed by image constructor 543 to perform further processing, described in greater detail below. It should be appreciated that visible imaging subsystem 530 alternatively may be configured to obtain an image based on any other range of light, for example, any suitable broadband or multiband range(s) of light.

Light that dichroic beamsplitter 531 does not redirect to FPA 532 is instead transmitted to band-pass filter 522, which is configured to block light at wavelengths other than those generated by illumination subsystem 510 (e.g., has a bandwidth of ±5 nm, or ±10 nm, or ±25 nm), so that the remainder of sensor subsystem 520 receives substantially only the laser pulse portions generated by illumination subsystem 510 that the scene reflects or scatters back towards system 500 (e.g., pulse portions 127, 128, 129 illustrated in FIG. 1). The light transmitted through band-pass filter 522 is then transmitted through polarizer 523, which eliminates light of polarization other than a desired polarization, e.g., so that the light transmitted therethrough is substantially all H-polarized, or substantially all V-polarized (or right handed circularly polarized, or left handed circularly polarized). Polarizer 523 may be, for example, a sheet polarizer, or a polarizing beamsplitter, and preferably is relatively insensitive to angle. The light transmitted through polarizer 523 is then transmitted through modulator 524, which is positioned at the other image plane of receiving lens 521. The functionality of modulator 524 is described in greater detail below. In some embodiments, the image plane of receiving lens 521 is at a location in sensor subsystem 520 other than in modulator 524.

Modulator 524 optionally may be followed by compensator 525, which may correct phase errors that modulator 524 may impose on the beam due to variations in the beam angle, thus further enhancing the acceptance angle of modulator 524. Compensator 525 may include a material having the opposite birefringence of the material in modulator 524. For example, where modulator 524 includes potassium dihydrogen phosphate (KDP), compensator 525 may include magnesium fluoride (MgF$_2$) which has the opposite birefringence of KDP and is commercially available. Other materials may be suitable for use in compensator 525, depending on the characteristics of the material used in modulator 524, such as if the modulator material is potassium dideuterium phosphate (KD*P), compensator materials may be rutile, yttrium lithium fluoride (YLF), urea, or yttrium orthovanadate (YVO$_4$), among others. Additionally, the thickness of compensator 525 may be selected to provide an appropriate contrast ratio over the acceptance angle of the system. In one illustrative embodiment, compensator 525 includes a crystal of MgF$_2$ having a length between 8.78 mm and 8.82 mm for a modulator of KD*P of 3 mm length. For other modulator designs, such as modulator materials that are oriented such that the crystal axis is orthogonal to the optical axis, the compensator may be a second modulator with the crystal axis rotated 90 degrees about the optic axis.

Following transmission through and modulation by modulator 524 and optional compensator 525, imaging lens 526 images the modulated light onto first and second FPAs 528, 529. Specifically, polarizing beamsplitter 527 separates the orthogonal polarization components of the modulated beam (e.g., the H- and V-polarization components, or left- or right-handed circularly polarized components), which it then redirects or transmits, respectively, to first and second FPAs 528, 529, which are positioned in the image plane of imaging lens 526. Imaging lens 526 may include a single lens, a compound lens, or a plurality of lenses. In some embodiments, two imaging lens 526 may be placed after the polarizing beamsplitter 527, with one each in front of FPAs 528, 529. First and second FPAs 528, 529 record images of the modulated light imaged upon them, and are in operable communication with controller 541, which obtains the recorded images and provides them to storage 542 for storage and further processing by image constructor 543.

A description of various embodiments of modulator 524 and FPAs 528, 529 will now be provided. A description of the calculation of object positions and shapes within the scene will be provided further below with reference to processor subsystem 540.

Modulator

As noted above with reference to FIG. 1, a modulator may be used to vary the polarization of the laser pulse portions reflected from the scene, allowing for the ranges and shapes of objects in the scene to be calculated with high precision. A Pockels cell or a Kerr cell may in some embodiments be used to perform such a modulation. However, previously known Pockels cells typically have relatively small apertures (e.g., 1 cm or smaller) and small acceptance angles (e.g., less than 1 degree) and operate at relatively high voltages, which may make them undesirable for use in imaging systems. Additionally, the angular extent of the reflected light received by the modulator may be magnified by the inverse of the magnification of the receiving optical elements. As such, it may be desirable to use a modulator having a wider acceptance angle, a wider aperture, and a lower operating voltage. For example, in the three-dimensional imaging system illustrated in FIG. 5, the light captured by receiving (Rx) lens 521 may have angles varying between 5 and 40 degrees and an aperture of 2-4 inches, for example, which a previously known Pockels cell may not be configured to properly modulate. Thus, it may be desirable to provide a polarization modulator having a large aperture, a low operating voltage, and a large acceptance angle, e.g., greater than 5 degrees, for example, between 5 and 40 degrees, while providing a high contrast ratio, e.g., greater than 300:1, or greater than 500:1.

For embodiments in which the modulator is a Pockels cell, there are known techniques for increasing the angular acceptance bandwidth of a Pockels cell. These may be used in various embodiments of the invention. For example, in one embodiment, the Pockels cell may be made thin by using transparent electrodes. Decreasing the length increases the angular acceptance. Similarly, the modulator aperture may be increased by using transparent electrodes. In one illustrative example, modulator 524 is a longitudinal Pockels cell including a slab of potassium dideuterium phosphate (KD*P) having a thickness of less than 5 mm with transparent or semi-transparent electrodes disposed thereon or on protective windows placed proximate to the KDP surfaces, e.g., a coating of indium tin oxide (ITO), a conductive grid having a spacing selected to match the pixel spacing of FPAs 528, 529 to reduce diffraction losses, or any suitable combination of transparent film and metallic features.

Pockels cell materials have birefringence (different values of the refractive index for light polarized along different axes of the crystal structure) which further restricts the angular acceptance. However, for Pockels cell designs known as transverse cells, manufacturers have carefully matched the thickness of two identical cells, rotating the cells 90 degrees about the propagation axis. One cell then cancels out the contribution of the other. For some materials and orientations, it may be necessary to use four cells. This also may make the cells relatively insensitive to effects caused by temperature changes. Such a technique may not work for longitudinal Pockels cells, but in this case, additional material is added. The material has birefringence of opposite sign and the thickness is carefully matched. For example, potassium dihydrogen phosphate (KD*P) is a common material for longitudinal cells and is negatively birefringent. Positively birefringent materials are also available, such as $MgF_2$. These techniques may allow for a high angular acceptance for a Pockels cell modulator.

Figure 7A:
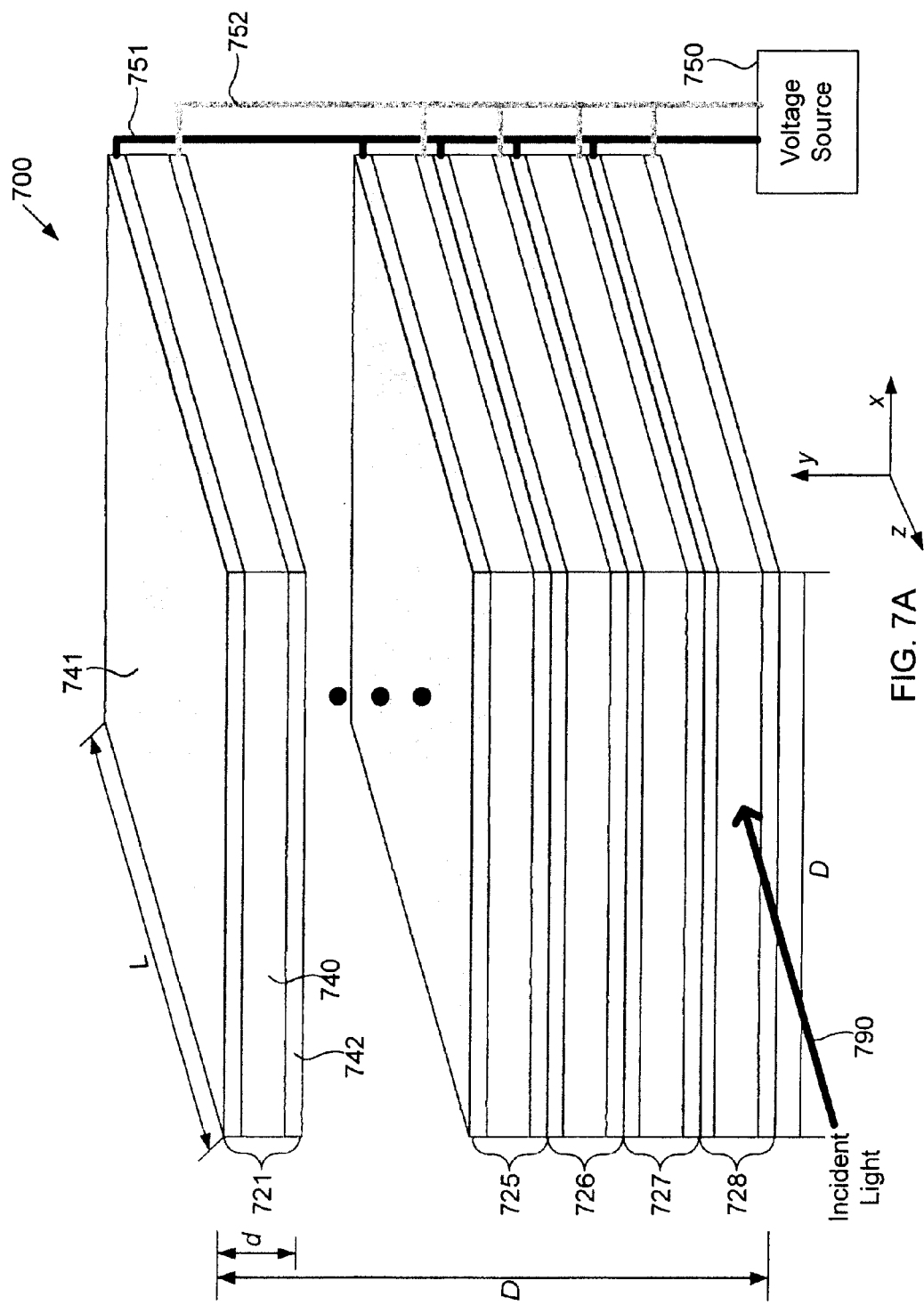
FIG. 7A illustrates a perspective view of a wide-aperture, low-voltage Pockels assembly, according to some embodiments of the present invention.

One embodiment of a modulator having a wide aperture and large acceptance angle is illustrated in FIG. 7A. Pockels assembly 700 includes stack of transverse Pockels cells 721, . . . 728 arranged both optically in parallel and electrically in parallel or in series, and voltage source 750 coupled thereto via conductors 751, 752. Voltage source 750 may be included in processor subsystem 540 of FIG. 5, or may be included in sensor subsystem 520 and controlled by controller 541. Pockels cells 721, . . . 728 are secured together using any appropriate means, such as an adhesive between the Pockels cells, or a housing surrounding the cells so as to secure them together, or otherwise appropriately secured, for example via the electrodes, as described below. Although the illustrated embodiment includes eight transverse Pockels cells 721, . . . 728 (cells 722-724 being omitted for clarity), any suitable number of transverse Pockels cells may be used, e.g., between 5 and 10,000 transverse Pockels cells, or, e.g., between 10 and 500 transverse Pockels cells, or, e.g., between 20 and 200 transverse Pockels cells, or, e.g., between 50 and 100 transverse Pockels cells. In some embodiments, Pockels assembly 700 is constructed so as to provide a contrast ratio of, for example, greater than 300:1, or even greater than 500:1.

Transverse Pockels cell 721 includes a thin slab 740 of electro-optic material, and first and second electrodes 741, 742 are disposed on opposing major surfaces of slab 740. Slab 740 may have a thickness of, for example, less than 1 mm. In particular, it may be preferable for slab 740 to have a thickness of less than 100 μm, or of less than 50 μm, for example, between 100 and 10 μm, or between 80 μm and 30 μm, or between 60 μm and 40 μm, or about 50 μm. Slab 740 may be made of any suitable material, including but not limited to potassium dihydrogen phosophate (KDP), potassium dideuterium phosphate (KD*P), lithium niobate (LN), periodically poled lithium niobate, lithium tantalate, rubidium titanyl phosphate (RTP), beta-barium borate (BBO), and isomorphs of these crystalline materials. An isomorph has a similar material and stoichiometric structure, but different elements. The particular dimensions and configuration of the elements of Pockels assembly 700 may be selected based on the optical transmission characteristics, electro-optic coefficients, refractive index, birefringence, and physical properties of the material selected for use in slab 740. Additionally, the edges of slab 740 may be polished to avoid distorting light propagating therethrough, and/or coated to reduce reflections.

In Pockels assembly 700, the first electrodes 741 of each of Pockels cell 721, . . . 728 are connected in parallel to one another and to a first conductor 751 coupled to voltage source 750, while the second electrodes 742 of each Pockels cell 721, . . . 728 are connected in parallel to one another and to a second conductor 752 coupled to voltage source 750. Voltage source 750 applies an appropriately varying voltage potential across first conductor 751 and second conductor 752, so as to vary the birefringence of each slab 740 as a function of time. As indicated previously in equation (1), the required half-wave voltage for a transverse Pockels cell is proportional to the thickness. Since the aperture is divided into N cells, the thickness of each being 1/Nth that of the combined aperture, the half-wave voltage that would be required to induce a relative π phase delay in orthogonal fields for a single crystal, expressed by equation (1) above, may be divided by N, the number of transverse Pockels cells 721, . . . 728 in Pockels assembly 700. Thus, instead of a half-wave voltage of several hundreds or thousands of volts as required for previously known Pockels cells, which may require cumbersome high-voltage drivers, Pockels assembly 700 may be characterized a half-wave voltage on the order of tens of volts, or even less than ten volts, improving the practicality of incorporating it into a commercial system.

First and second electrodes 741, 742 may include any suitable conductor, e.g., a metal such as gold, aluminum, copper, or solder, or a conductive polymer, or a transparent conductor such as indium tin oxide (ITO), fluorine doped tin oxide (FTO), or doped zinc oxide. In one illustrative embodiment, first and second electrodes 741, 742 are transparent electrodes having approximately the same refractive index as slab 740. Electrodes 741, 742 may be disposed on opposing major surfaces of slab 740 using any suitable method, e.g., with sputtering, electroplating, evaporation, spin-coating, and the like. Electrodes 741, 742 may also perform the function of securing Pockels cells 721, . . . 728 together. For example, electrodes 741, 742 may function as solder or braze that secures Pockels cells 721, . . . 728 to one another. One or more of electrodes 741, 742 optionally may also include an insulative cap to inhibit shorting between electrode 742 of one Pockels cell (e.g., Pockels cell 725) and electrode 741 of another Pockels cell (e.g., Pockels cell 726).

The optic axis of slab 740 is oriented in the z-direction, which is parallel to incident light 790, and the slab is oriented at a defined angle in the x- and y-directions relative to the polarization of polarizer 523 illustrated in FIG. 5. In the illustrated embodiment, slab 740 is oriented parallel to the x-direction, corresponding to a horizontal (H) polarization, although other arrangements are envisioned, depending on the particular arrangement and material used. The crystal axes of the electro-optic material of slab 740 may be oriented in any suitable direction. For example, the z-axis of the electro-optic material may be parallel to, or may be orthogonal to, the propagation direction of incident light 790, which in FIG. 7A is in the z-direction. Or, for example, the y-axis of the electro-optic material may be parallel to the propagation direction of incident light 790, or the x-axis of the electro-optic material may be parallel to the propagation direction of incident light 790.

Pockels assembly 700 includes a sufficient number N of Pockels cells 721, . . . 728 to provide a desired clear aperture D in the x-direction for use in the desired application, e.g., for use in system 500 illustrated in FIG. 5. Specifically, the minimum number N of Pockels cells is approximately equal to the desired clear aperture D, divided by the thickness d of each Pockels cell (assuming all Pockels cells are the same thickness), i.e., N=D/d. In many circumstances, the thickness of electrodes 741, 742 (which are not drawn to scale in FIG. 7A) is negligible compared to the thickness of slab 740, in which case d may be approximately equal to the thickness of slab 740. Each transverse Pockels cell 721, . . . 728 is also configured to have a lateral dimension at least as large as the desired clear aperture D.

As incident light 790 propagates through Pockels assembly 700, different portions of that light enter different Pockels cells 721, . . . 728. Within each Pockels cell, the light propagating therethrough repeatedly reflects off of the major surfaces of that cell, and experiences interference with itself. The phase of the light propagating through the sheets can be reconstructed, and thus the image at the entrance of the Pockels cell, at periodic planes along the propagation direction. This effect is known as the Talbot effect. The planes at which the phase and image are reconstructed are known as Talbot imaging planes. Preferably, the Pockels cells 721, . . . 728 have a length L in the z-direction that corresponds to a Talbot imaging plane, so that the light incident to Pockels assembly 700 will be re-imaged following propagation through the entirety of Pockels assembly 700. As such, the length L of transverse Pockels cells 721, . . . 728 is preferably approximately equal to:

$$L = m\frac{4d^2 n}{\lambda} \quad (6)$$

where m is an integer, d is the thickness of the Pockels cell, n is the refractive index of slab 740, and λ is the wavelength of the incident light. Additional image planes may also occur at ¼ multiples of the length L in equation (6), but of inverted symmetry and/or greater sensitivity to characteristics of the incident light. The extended surfaces on which the electrodes are disposed may be polished in order to reduce any phase randomization from scattering. The Talbot effect itself is insensitive to angle; however surface losses at the electrode interface may create a practical limitation to the angular acceptance of assembly 700. In some embodiments, an additional layer or multiple layers of optical coatings may be added to minimize any absorptive or refractive losses at the interfaces between the slab 740 and the electrodes 741, 742. Note also that in embodiments in which electrodes 741, 742 are substantially transparent and have the same, or approximately the same, refractive index as slab 740, the Talbot effect may be reduced, or even vanish, because reflections between adjacent transverse Pockels cells may be reduced, or even vanish. In such an embodiment, the length L of Pockels assembly 700 may be set to any appropriate length (not necessarily dictated by equation (6)), as Talbot planes may not necessarily occur.

In one embodiment, the incident laser light is centered at 1064 nm, m is equal to 1, the material is lithium niobate having a refractive index n of 2.237, and d is 0.05 mm, for which L is approximately equal to 2.1 cm. In another embodiment, the thickness of the lithium niobate material is 0.025 mm, for which L is approximately 0.53 cm. The aspect ratio of the material thickness to length decreases within decreasing thickness, which may be advantageous for manufacturability. The thickness and length of the individual Pockels cells slabs 740 can be adjusted according to equation (6) to enhance overall performance.

In one embodiment, slab 740 comprises a crystal of lithium niobate that is cut and polished such that incident light propagates parallel to the z-axis of the crystal and the first and second electrodes 741, 742 are thin layers of a metallic conductor, such as copper, disposed on the major surfaces of slab 740, which are normal to the x-axis of the crystal. In this embodiment, the x- and z-axes of the crystal are parallel to the x- and z-directions of the system, as defined in FIG. 7A. For such a crystal, the half-wave voltage $V_{1/2}$ is given by:

$$V_{1/2} = \frac{\lambda d}{2 r_{22} n_o^3 L} \quad (7)$$

where $r_{22}$ is the electrooptic tensor element for lithium niobate, and $n_o$ is the ordinary refractive index of lithium niobate. For a slab thickness of 0.05 mm and a central laser wavelength of 1064 nm and an ordinary refractive index of 2.237, the half-wave voltage for Pockels assembly 700 is approximately 21 V for $r_{22}$=5.61 pm/V.

Alternatively, periodically poled lithium niobate (PPLN) may be used as the material in slabs 740. Chen et al. (Optics Letters, Vol. 28, No. 16, Aug. 15, 2003, pages 1460-1462, the entire contents of which are incorporated herein by reference) studied the response of a single transverse Pockels cell including a PPLN slab of thickness of 1 mm and length 13 mm, and reports a half-wave voltage of 280V. Because this value may scale with thickness and length, it may be reasonably assumed that for slab a thickness of 0.05 mm and a central laser wavelength of 1064 nm, the half-wave voltage for a Pockels assembly 700 would be approximately 9 V.

Figure 7B:
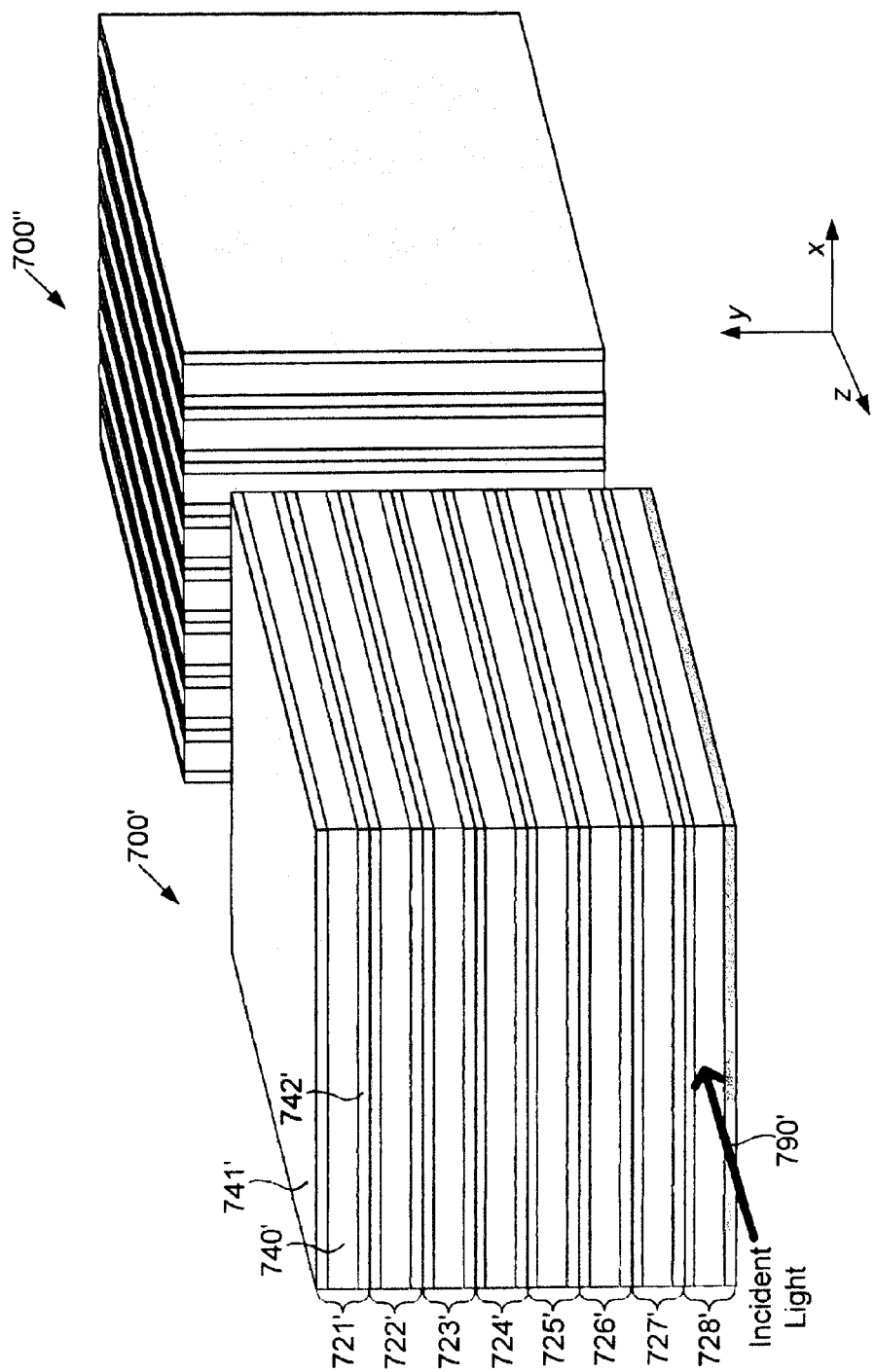
FIG. 7B illustrates a perspective view of an alternative wide-aperture, low-voltage Pockels assembly, according to some embodiments of the present invention.

Alternatively as illustrated in FIG. 7B, Pockels assembly 700' includes transverse Pockels cell 721', ... 728', each of which includes a slab 740' having a crystal of lithium niobate that is cut and polished such that incident light 790' propagates parallel to the x-axis of the crystal. The first and second electrodes 741', 742' are disposed on the major surfaces of slab 740', which are normal to the z-axis of the crystal. In this embodiment, the x- and z-axes of the crystal are respectively parallel to the z- and x-directions defined in FIG. 7B. An additional phase for off-axis rays because of the natural birefringence optionally may be compensated for by providing a second, identical Pockels assembly 700" which is rotated 90 degrees in the x-direction from assembly 700'. In this case, the required half-wave voltage of the two assemblies is approximately half that required for a single assembly, e.g., assembly 700 in FIG. 7A.

Figure 7C:
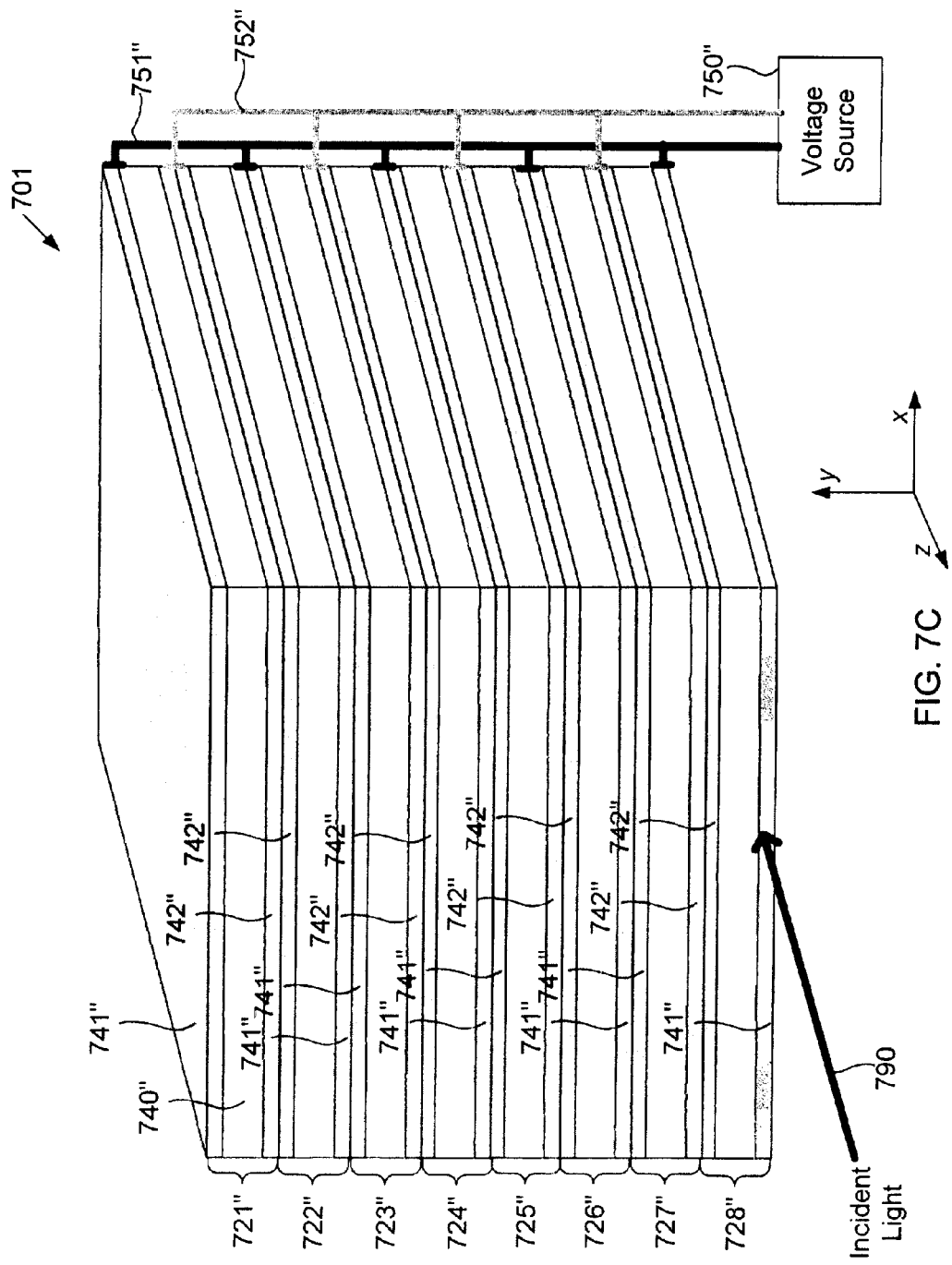
FIG. 7C illustrates a perspective view of an alternative wide-aperture, low-voltage Pockels assembly, according to some embodiments of the present invention.

FIG. 7C illustrates another alternative Pockels assembly 701 in which the first electrodes 741" of adjacent Pockels cells are arranged so as to be disposed adjacent to one another and connected in parallel to one another and to a conductor 751" coupled to voltage source 750". For example, first electrode 741" of cell 722" is adjacent to and coupled to first electrode of cell 723". The second electrodes 742" of adjacent Pockels cells are also arranged so as to be disposed adjacent to one another and connected in parallel to one another and to a conductor 752" coupled to voltage source 750". For example, second electrode 742" of cell 721" is adjacent to and coupled to second electrode 742" of cell 722". An arrangement such as illustrated in FIG. 7C may obviate the need to provide an insulative cap on the electrodes, because the upper or lower electrode of adjacent Pockels cells are intentionally placed in electrical contact with the lower or upper electrode of their neighbor. Indeed, in some embodiments only a single electrode need provided between each slab (that is, electrodes 742", 742" of Pockels cells 721" and 722" may be combined to form a single electrodes).

It should be clear that Pockels assemblies 700, 700', and 700" illustrated in FIGS. 7A-7B are not limited to use in three-dimensional imaging systems, such as system 500 illustrated in FIG. 5. Instead, Pockels assembly 600 may be used in any appropriate system that would benefit from a modulator having a large clear aperture, a low operating voltage, and/or a large acceptance angle.

Although system 500 of FIG. 5 is described as including a Pockels cell-based modulator, such as modulator 700 of FIG. 7A, other types of modulators may be used to encode the TOFs of reflected/scattered pulse portions from the scene as an intensity modulation on an FPA. Such an embodiment may not directly modulate the light, but instead may modulate the amplitude of the signal generated by the photoelectrons measured by the circuits of the FPAs. For example, in one alternative embodiment, polarizer 523, modulator 524, and compensator 525 are omitted, and the gain of the pixels of FPA 529 is modulated as a function of time, whereas the gain of the pixels of FPA 528 are not modulated as a function of time. In this embodiment, the polarizing beamsplitter 527 would be replaced by a nonpolarizing beamsplitter. An FPA includes an array of photosensitive sites (referred to as pixels) with accompanying circuitry to measure the total charge created by incident photons. Some of the circuitry is configured to amplify the signal generated by photoelectrons in the pixel so as to produce gain (the fraction of the measured current to the number of photoelectrons generated). In this embodiment, such circuitry may be configured to vary the gain characteristics of the array of FPA 529, and/or of individual pixels in the array of FPA 529, over a time window of interest, e.g., 10 ns, to produce a temporally dependent modulation in the electrical signal associated with each pixel.

Such a temporally dependent modulation may be used to determine the TOF of a laser pulse portion reflected or scattered from a scene. Specifically, a non-modulated signal obtained using FPA 528 may be used as a normalization image, against which the modulated image obtained using FPA 529 may be normalized. Alternatively, a non-modulated image may be obtained using FPA 529 by turning off any modulation for one frame at some interval, which image may be used as a normalization image, against which the modulated image obtained using FPA 529 during the other frames may be normalized; in such an embodiment, beamsplitter 527 and FPA 528 may be omitted. In such an embodiment, it is preferable that objects in the scene do not significantly move between the time the normalization image is acquired and the time the modulated image is acquired or the amount of light received by receiving lens 521 does not change significantly; the frame rate of the FPA optionally may be adjusted to reduce the chance of such movement. The intensity of each normalized pixel represents the TOF of the pulse portions reflected/scattered by the objects in the scene, and thus the distance and shape of those objects. Although there is no absolute reference for the intensity at each pixel, a frame at some periodic frequency during a series of frames could be processed without modulation (e.g., the gain for all pixels set to the maximum value being used). Such a frame provides the absolute amplitude reference, provided that the reflected signal does not change significantly between reference frames.

Alternatively, instead of temporally modulating the gain of each pixel, the amount of light received by each pixel may be temporally modulated by providing a polarization rotator, coupled to a thin polarizer, in front of each pixel. The polarization rotators may be individually addressable, or may be collectively controlled so as to approximately uniformly vary the amount of light received by the pixels. The normalization image may be obtained, for example, analogously to as described above for gain modulation. In another embodiment, the polarization rotator may be omitted and a temporally variable attenuator provided instead. In general, a transducer may be used to vary the amount of photoelectrons that are produced by a pixel of the FPA in a controlled function over 0.1-100 ns. In one embodiment, the transducer acts uniformly on all pixels of the FPA so that only one drive waveform is needed.

In another alternative embodiment, modulator 524 of system 500 illustrated in FIG. 5 includes an electro-optic Bragg deflector, and compensator 525 and beamsplitter 527 are omitted. FPA 528 is positioned to receive one diffraction order from the electro-optic Bragg deflector, and FPA 529 is positioned to receive the zero (or undiffracted beam) diffraction order from the electro-optic Bragg deflector. In some embodiments, the two Bragg orders will be incident on different areas of the same FPA 529. A temporally modulated control signal is applied to the electro-optic Bragg deflector, so as to vary the intensity in the diffraction orders received by FPA 528 and 529 over a time window of interest, e.g., 10 ns. The images received and subsequent processing may be substantially similar to those modulated by the Pockels assembly. In one embodiment, only FPA 528 (or 529) receives a modulated signal, and FPA 529 (or 528) receives a non-modulated signal against which the modulated signal may be normalized.

In yet another alternative embodiment, modulator 524 of system 500 includes an etalon, such as a temporally modulable Fabry-Perot interferometer having opposing reflective surfaces. Polarizer 523, modulator 524, compensator 525, and beamsplitter 527 may be omitted. The transmission of an etalon for monochromatic light is based on the finesse of the etalon and the spacing between the reflective surfaces; thus, by varying the distance between the surfaces as a function of time, the intensity of light transmitted by the etalon to FPA 529 may vary depending on the TOF of the light. In one embodiment, the etalon is solid, with the distance between the reflectors being controllably variable as a function of time using, for example, piezoelectric transducers to compress or stretch the material. FPA 528 may be configured so as to receive non-modulated light, which may be used to obtain a normalization image against which the modulated image from FPA 529 may be normalized.

FPAs

In the embodiment illustrated in FIG. 5, first and second FPAs 528, 529 are positioned in the focal plane of imaging lens 526, and respectively receive light of orthogonal polarizations. For example, polarizing beamsplitter 527 may direct light of H-polarization onto FPA 528, and may transmit light of V-polarization onto FPA 529. FPA 528 obtains a first image based on a first polarization component, and FPA 529 obtains a second image based on the second polarization component. FPAs 528, 529 provide the first and second images to processor subsystem 540, e.g., to controller 541, for storage and further processing, as described in greater detail herein. Preferably, FPAs 528, 529 are registered with one another. Such registration may be performed mechanically, or may be performed electronically (e.g., by image constructor 543).

In some embodiments, FPAs 528, 529 are off-the-shelf CCD or CMOS imaging sensors. In particular, such sensors may be readily commercially available for visible-wavelength applications, and require no significant modification for use in system 500. In one example, FPAs 528, 529 are commercially purchased CCD sensors having 2 Megapixel resolution. Some sensors for use in near-infrared applications are currently commercially available, albeit at substantially greater cost than the ubiquitous visible-wavelength sensors, and others are currently being developed. It is anticipated that any of a variety of sensors, including those yet to be invented, may be used successfully in many embodiments of the present invention. Optional FPA 632 may in some embodiments be the same as FPAs 528, 529.

However, sensors having a particular set of characteristics may in some circumstances be preferred. For example, as noted above, providing a focal plane array in which each pixel has a deep electron well, e.g., greater than 100,000 electrons, may enhance the signal to noise ratio obtainable by the system. The focal plane array also, or alternatively, may have a high dynamic range, e.g., greater than 40 dB, or greater than 60 dB. Additionally, wells of such effective depths may be obtained by combining the outputs of pixels of shallower depth (e.g., 4 pixels each having a well depth of 25,000 or more electrons). Preferably, each pixel of the FPA is designed to substantially inhibit "blooming," so that the electrons of any pixels that may become saturated do not bleed over into adjacent pixels.

C. Processor Subsystem 540

Referring again to FIG. 5, processor subsystem 540 includes controller 541, storage 542, image constructor 543, GPS unit 544, and power supply 545. Not all of such components need be present in all embodiments. The functionalities of such components may alternatively be distributed among other components of system 500, including but not limited to on-board processors on FPAs 528, 529. As described above, controller 541 may be in operable communication with one or more elements of illumination subsystem 510, such light source 511 and transmission (Tx) lens 512, and/or of sensor subsystem 520, such as receive (Rx) lens 521, optional FPA 532, modulator 524, and first and second FPAs 528, 529. For example, modulator 524 may be configured to modulate the polarization of light pulse portions transmitted therethrough as a function of time, responsive to a control signal from controller 541. In one exemplary embodiment, controller 541 sends a control signal to voltage source 750 illustrated in FIG. 7A, which applies appropriate voltages to Pockels cells 721, . . . 728 via conductors 751, 752. Controller 541 is also in operable communication with storage 542, image constructor 543, GPS unit 544, and power supply 545.

Controller 541 is configured to obtain images from optional FPA 532 and first and second FPAs 528, 529 and to provide the images to storage 542 for storage. Storage 542 may RAM, ROM, a hard drive, flash drive, or any other suitable storage medium. Image constructor 543 is configured to obtain the stored images from storage 542 and to construct three-dimensional images based thereon, as described in greater detail below. GPS 544 is configured to identify the position and/or attitude of system 500 as it obtains images, and to provide such information to storage 542 to be stored with the corresponding images. Additionally, an accelerometer or other suitable attitude measuring device may be used determine an approximate change in attitude of the system 500 from one frame to the next in a series of images. This information may be used as part of a method to register the images to a global or relative reference frame. Power supply 545 is configured to provide power to the other components of processor subsystem 540, as well as to any powered components of illumination subsystem 510 and sensor subsystem 520.

Responsive to the control signal that controller 541 generates, modulator 524 generates a phase delay $\Gamma$ between orthogonal polarization states for pulse portions transmitted therethrough. The phase delay $\Gamma$ is a function of time, and may be expressed by:

$$\Gamma = g(V(t)) \tag{8}$$

where g is the response of modulator 524 as a function of voltage V, and V(t) is the applied voltage as a function of time. The intensity $I_{528,i,j}$ of the modulated light pulse portion that is received at pixel (i,j) of first FPA 528 may be expressed as:

$$I_{528,i,j} = I_{total,i,j} \cos^2(\Gamma/2) \tag{9}$$

while the intensity $I_{529,i,j}$ of the modulated light pulse portion received at pixel (i,j) of first FPA 529 may be expressed as:

$$I_{529,i,j} = I_{total,i,j} \sin^2(\Gamma/2) \tag{10}$$

where, in the embodiment illustrated in FIG. 5, $I_{total,i,j}$ is equal to $I_{528+529,i,j}$, which is the sum of the intensity received by pixel (i,j) of first FPA 528 and the intensity received by the corresponding pixel (i,j) of second FPA 529. In other words, $I_{528+529,i,j}$ is the non-modulated intensity that would be received by FPA 529 if polarizing beamsplitter 527 were removed. Although $I_{total,i,j}$ is computed based on the sum of two complementary images in the embodiment of FIG. 5, in other embodiments $I_{total,i,j}$ may be obtained by obtaining an image of non-modulated light, as described in greater detail below with reference to FIG. 12.

The TOF $t_{i,j}$ for each light pulse portion imaged at pixel (i,j), i.e., the time it took that portion to travel from illumination subsystem 510, to the scene, and to sensor subsystem 520, may be determined by solving for t (the pulse portions TOF) from equations (9) and (10), which may be expressed as follows:

$$t_{i,j} = t_0 + V^{-1}\left(g^{-1}\left(2\cos^{-1}\left(\sqrt{\frac{I_{528,i,j}}{I_{total,i,j}}}\right)\right)\right) \quad (11)$$

where $t_0$ is the time between when the light pulse leaves illumination subsystem 510 to when modulator 524 begins modulating the polarization of light transmitted therethrough, e.g., $t_0$ represents a distance offset from the device to the object in the scene. As discussed further below, $t_0$ may be determined using any one of several ranging techniques. The distance $z_{i,j}$ of the object from which the pulse portion reflected or scattered may then be calculated as follows:

$$z_{i,j} = \frac{ct_{i,j}}{2} \quad (12)$$

Where the functions V and g are monotonic functions of time, equations (11) and (12) have a unique solution for the distance $z_{i,j}$. Thus, image constructor 543 may calculate the distance $z_{i,j}$ for each portion of each object in a scene by obtaining from storage 542 the images respectively recorded by first and second FPAs 528, 529 and applying equations (11) and (12) thereto. Note that such a calculation may require knowledge of the inverse of the response function as a function of time and voltage, g(V(t)), of modulator 524. In some embodiments, such information may be obtained by carefully calibrating the system. An example of such a calibration is provided further below.

Where the functions V and g are not monotonic functions of time, then additional information may be used to determine which of the several possible values of $z_{i,j}$ is the correct value for the pixel (i,j). There are many ways to obtain the additional information. For example, multiple wavelengths of light may be used to illuminate the scene. The polarization modulation Γ may be a different function of voltage for each wavelength, which changes the intensity ratio for each wavelength. Another example is to have a second modulation arm (similar to that described below with respect to FIG. 11) with a second modulator, a second polarizing beamsplitter, and a second pair of FPAs. The second modulator may apply a different voltage function of time, e.g., $V_2(t)$. This would give another set of solutions for the distance $z_{i,j}$ and only the correct one will be present in both solution sets. Because the reflected light is typically not polarized, an initial polarization-sensitive beamsplitter will already provide a second optical path where this second modulation arm may be positioned. Another example is to use cues within the image itself to determine the correct distance value. There are many techniques that are already used to determine three-dimensional information from a two-dimensional image; these may be applied to enhance the performance. Additionally, if the relative positions of objects are known (e.g., because of perspective effects) or it is known that the surface in question is continuous, this information may also be used to determine the correct distance value. There are many other techniques as well that may be employed.

In some embodiments, the computation of distances $z_{i,j}$ may be somewhat simplified by linearly modulating the voltage as a function of time of a modulator based on the Pockels effect (e.g., Pockels assembly 700 illustrated in FIG. 7A, or some other suitable modulator). In such a modulator, the polarization modulation Γ as a function of time may be expressed as:

$$\Gamma = At \quad (13)$$

where A is a constant. Additionally, because the modulator is based on the Pockels effect, the polarization modulation is a linear function of the applied voltage, and may be expressed as:

$$\Gamma = BV \quad (14)$$

where B is a constant that expresses the linear response function of the modulator as a function of voltage. For such a modulator, the distance $z_{i,j}$ of an object from the three-dimensional imaging system 500 may be expressed as:

$$z_{i,j} = c\frac{\cos^{-1}\left(\frac{I_{528,i,j}}{I_{total,i,j}}\right)}{AB}. \quad (15)$$

The values of the constants A and B may be determined by calibrating the system and/or may be known properties of the modulator. The simplicity of such a calculation allows processor subsystem to obtain real-time distance measurements, even with relatively simple electronics. The resulting device thus may be relatively compact, more power efficient, and require no sophisticated post-processing to obtain the distance value for each pixel in the image, as compared to many other current technologies. Such calculations alternatively may be performed using the on-board electronics within FPAs 528, 529.

In one embodiment, first and second discrete FPAs 528, 529 and image constructor 543 constitute a means for generating a first image corresponding to received light pulse portions and a second image corresponding to modulated received light pulse portions, which may be used to obtain a three-dimensional image based thereon. For example, the first image may correspond to the sum of two complementary modulated images obtained by FPAs 528, 529 (which sum may be computed by image constructor 543), and the second image may correspond to the image obtained by FPA 529. In another embodiment, a single FPA and image constructor 543 constitute a means for generating a first image corresponding to received light pulse portions and a second image corresponding to modulated received light pulse portions, which may be used to obtain a three-dimensional image based thereon. For example, the first image may correspond to the sum of two complementary modulated images obtained by a single FPA (which sum may be computed by image constructor 543), and the second image may correspond to one of the modulated images. Such embodiments may include those in which modulators other than a Pockels cell-based modulator were used to modulate the light pulse portions, e.g., an electro-optic Bragg deflector or other modulator provided herein.

In another embodiment, first and second discrete FPAs 528, 529 constitute a means for generating a first image corresponding to received light pulse portions and a second image corresponding to modulated received light pulse portions. For example, the first image may correspond to the sum of two complementary modulated images obtained by FPAs 528, 529 (which sum may be computed by on-board circuitry on one or both of the FPAs), and the second image may correspond to the image obtained by FPA 529. In yet another embodiment, a single FPA constitutes a means for generating a first image corresponding to received light pulse portions and a second image corresponding to modulated received light pulse portions, which may be used to obtain a three-dimensional image based thereon. For example, the first image may correspond to the sum of two complementary modulated images obtained by a single FPA (which sum may be computed by on-board circuitry on the FPA), and the second image may correspond to one of the modulated images. Such embodiments may include those in which modulators other than a Pockels cell-based modulator were used to modulate the light pulse portions, e.g., an electro-optic Bragg deflector or any other modulator provided herein.

Note that the formulas expressed by equations (11), (12), and (15) are for the "ideal" case. In the real world, there are systematic and random errors in the measured values, e.g., in $I_{528,i,j}$, $I_{520,i,j}$, $t_0$, and $g(V(t))$ or A and B. For example, it is known that all FPAs, which convert received photons into electrons that are then measured electronically, suffer from noise electrons arising from many effects, including thermal effects in the electronics. These noise electrons may result in a noise signal N that is independent of the number of incident photons at each pixel and may be characterized by a mean value with a standard deviation. In addition, the photons arriving at each pixel generate shot noise by causing quantum fluctuation of the pixel's electromagnetic field. The standard deviation of this shot noise term goes as the square root of the number of photons received. There also may be errors associated with light other than light generated by illumination subsystem 510 irradiating FPAs 528, 529.

Errors such as those listed above may reduce the resolution (or increase the uncertainty) of the obtained distance measurements. Some embodiments of the present invention include techniques that reduce the uncertainty in the measured distance values, for example, to less than 5 mm in one embodiment. For this purpose, the uncertainty is defined as the standard deviation of the spread of values in the distance for a series of identical measurements.

As with other digital imaging techniques, the number of useful bits of signal available from the signal is equal to the total bits of signal minus the bits of noise signal, or equivalently the signal-to-noise ratio SNR). The SNR for a system may be expressed as:

$$SNR = \frac{I}{\sqrt{I + \sigma_{N1}^2 + \sigma_{N2}^2 + \ldots}} \quad (16)$$

where $\sigma_{N1}$ is the standard deviation of the noise from a first source, $\sigma_{N2}$ is the standard deviation of the noise from a second source, and I is the intensity of the signal. The number of bits $N_{sig}$ available to characterize the distance may be expressed as:

$$N_{sig} = \log_2 SNR. \quad (17)$$

Because the error in the distance measurement is proportional to the square root of the SNR, in some embodiments image constructor 543 may compute an error value for each pixel, and may indicate to the user, in real time, whether any errors exceed a predetermined threshold. Such a threshold may in some circumstances be set by the user based on the particular application. Responsive to the image constructor's indication that the errors exceed the predetermined threshold, the user may elect to re-image the scene, potentially at a higher light energy. In contrast, in previously known scanning techniques, it may not be known for some time whether all of the information about a scene was acquired with sufficient noise, e.g., may not be known until the point cloud is analyzed, which may be well after the user has completed the imaging process.

In one embodiment of the present invention, the distance resolution is improved by controlling the energy of light pulses that illumination subsystem 510 generates. Specifically, controller 541 may compare the intensity at the brightest portions of the images recorded by first and second FPAs 528, 529 to the saturation limit of the FPAs. If the intensity at the brightest portions is below some threshold percentage of the saturation limit of the FPAs, e.g., below 99%, or below 98%, or below 95%, or below 90%, of the saturation limit of the FPAs, then controller 541 may send a control signal to illumination subsystem 510 instructing it to increase the energy of the generated light pulses to a level at which the brightest portions of the images recorded by the first and second FPAs are at or above the threshold percentage of the saturation limits of the FPAs, but below the saturation limit. Conversely, if the intensity at the brightest portions is at or above the saturation limit of the FPAs, then controller 541 may send a control signal to illumination subsystem 510 instructing it to decrease the energy of the generated light pulses to a level at which the brightest portions of the images recorded by the first and second FPAs are below the saturation limits of the FPAs, but at or above the threshold percentage.

Controlling the pulse power to bring the brightest portions of the FPA images close to the saturation limit may increase the SNR for the shot noise, while at the same time dramatically increasing the SNR of the signal as compared to the constant noise sources, such as electronic noise. Because in many embodiments, three-dimensional imaging system 500 is positioned relatively close to objects in the scene, significantly more illuminating laser light is available for detection by the FPAs than is available in previously known systems configured to obtain distance information for remote objects. For example, whereas systems configured to obtain distance information for remote targets, the amount of received light is relatively low, and the constant electronic noise may detrimentally affect the data. For these previous devices, $N_{sig} < 5$ or worse, rendering the performance unsatisfactory for many applications. In contrast, in the described embodiment, monitoring the image intensity and controlling the laser energy appropriately may provide a value of $N_{sig} > 9$, an improvement of more than a factor of ten. Additionally, appropriately selecting an FPA with a high dynamic range may provide a value of $N_{sig}$ up to 20, for example.

Figure 8:
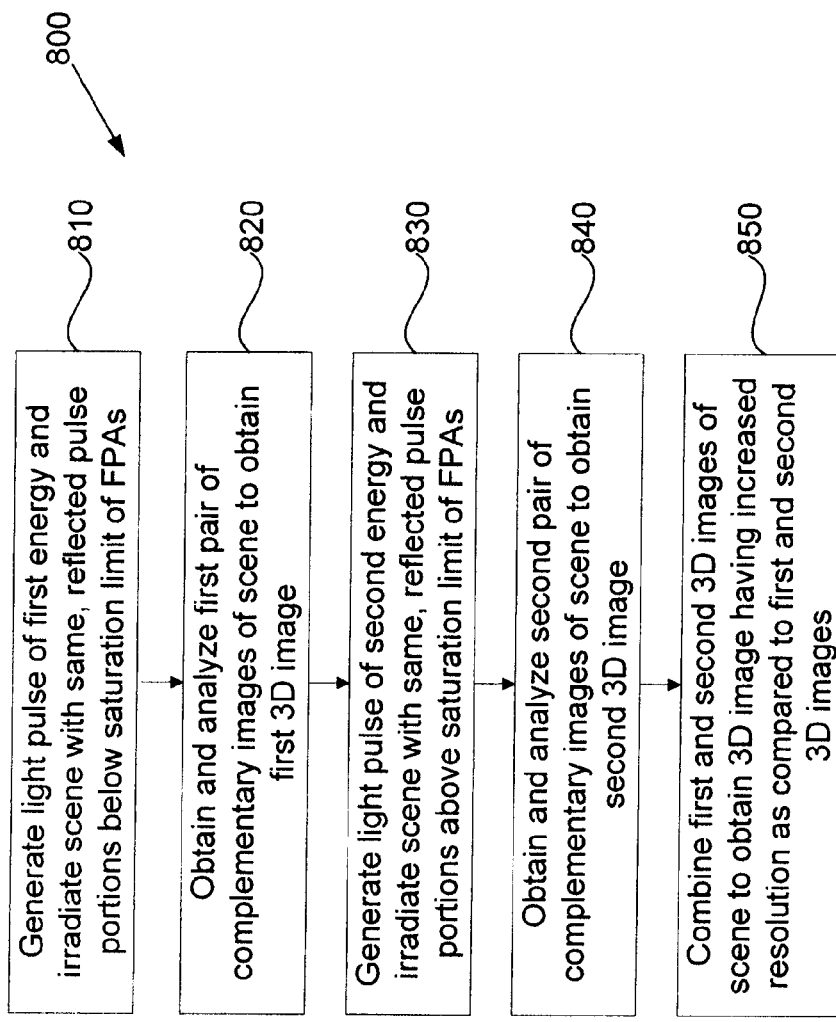
FIG. 8 illustrates steps in a method for increasing the information content of a three-dimensional image, according to some embodiments of the present invention.

For any given pair of complementary images, even if the brightest portions of the images are near the saturation limit of the FPAs, other portions of the images may be insufficiently illuminated to accurately calculate the distances of objects imaged in those portions. For example, portions or all of an object may be highly absorptive at the irradiation wavelength, and so may reflect or scatter insufficient light toward sensor subsystem 520. Or, for example, an object may be reflective, but may be angled so as to reflect the light pulses away from sensor subsystem 520. In such circumstances, it may be useful to obtain a sequence of images at varying pulse intensities, so as to increase the resolution of a three-dimensional image of the scene. FIG. 8 illustrates steps in a method 800 for increasing the resolution of an image of a scene. First, a light pulse of a first energy may be generated, and the scene irradiated with same (810). The first energy may be selected so that at least some of the pulse portions reflected/scattered by the scene are at or above the threshold percentage of the saturation limit, but below the saturation limit, of the FPAs. A first pair of complementary images of the scene are then obtained and analyzed to obtain a three-dimensional image (820). Some objects may be imaged with high resolution, because the SNR was high in their portions of the image, while other objects may be imaged with insufficient resolution, because the SNR was low in their portions of the image due to absorption or poor reflection, for example.

To obtain enhanced information about the objects that are insufficiently resolved in the first three-dimensional image, the measurement may be repeated using a laser pulse of greater energy, to obtain a larger amount of light from the absorptive or poorly reflective objects. Specifically, a light pulse of a second energy may be generated and the scene irradiated with same (830). For example, controller 541 may send a control signal to illumination subsystem 510 instructing it to generate a light pulse of a specified increased energy. Alternatively, controller 541 may send a control signal to a separate optical component in the optical path of the light pulse, such as a variable intensity filter or a liquid crystal attenuator, instructing it to allow a greater proportion of the light transmitted therethrough. The second energy may be selected so that at least some of the pulse portions reflected/scattered by the scene are above the saturation limit of the FPAs, e.g., are 10% or more, or 20% or more, or 50% or more, or 100% or more, or 200% or more, or 500% or more, or 1000% or more, above the saturation limit of the FPAs. Preferably, the FPAs are configured so that any pixels that saturate substantially do not "bloom," that is, do not leak photoelectrons onto adjacent pixels, giving the illusion of higher signal on those adjacent pixels.

A second pair of complementary images of the scene are then obtained and analyzed to obtain a second three-dimensional image (840). The objects that were insufficiently resolved in the first three-dimensional image may be imaged with higher resolution in the second three-dimensional image, because their SNR may be improved by increasing the light pulse energy for the second measurement. However, the second three-dimensional image may not contain usable information about other objects in the scene, such as those objects that were well-resolved in the first three dimensional image, because the pixels recording information of those objects may have been saturated by the light pulse of the second energy. As such, the first and second three-dimensional images of the scene may be combined to obtain a three dimensional image having increased resolution as compared to the first and second three-dimensional images (850). Any suitable algorithm may be used to determine which portions of the first and second images to use or to discard as corresponding to insufficiently resolved objects or saturated pixels. The measurements may be repeated using a variety of pulse energies so as to image each object in the scene with sufficient resolution. This method can be repeated over a series of frames, varying the level of saturation or exposure of FPAs 528, 529. This may be done for static scenes where the system 500 is not moving by properly combining the values at each pixel (i,j) from each of the several frames. In some embodiments, the system 500 may be moving or the object(s) of interest may be moving so that algorithms will be used to register the corresponding pixels of each frame to the pixels (i,j) of a master frame.

Note that method 800 illustrated in FIG. 8 may also be considered to increase the dynamic range of system 500. For example, a first image may include a signal of 1 to 100,000, which would correspond to $N_{sig}$=7.9, assuming a non-shot noise value of 10. A second image may be attenuated by 100,000 so that it would measure a signal from 100,000 to $10^{10}$. This provides another 8 bits so when the two images are combined, $N_{sig}$=15.9 bits.

Figure 9B:
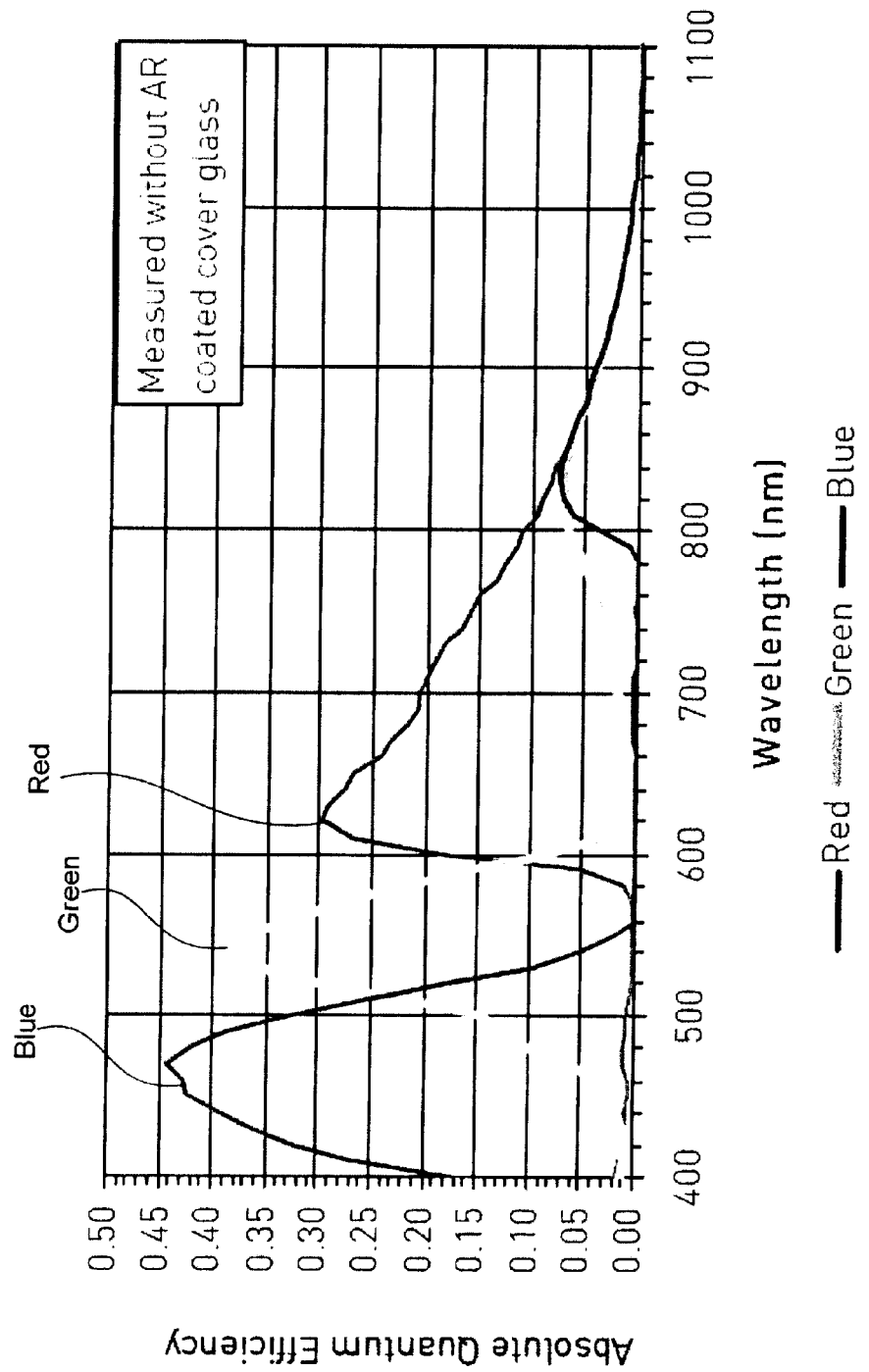
FIG. 9B illustrates transmission spectra of a commercially available color filter that may be used to increase the dynamic range of a focal plane array, according to some embodiments of the present invention.

The resolution and dynamic range of system 500 alternatively, or additionally, may be increased by increasing the dynamic range of FPAs 528, 529. For example, in one embodiment, the range of FPAs 528, 529 is increased by leveraging the color filters commonly provided on FPAs for the purpose of obtaining color images, such as Bayer filters. A schematic of a Bayer filter 900 is illustrated in FIG. 9A. Filter 900 includes a plurality of red filters (R), blue filters (B), and green filters (G). Each of the colored (R, B, or G) filters overlies a corresponding pixel on first or second FPAs 528, 529. FIG. 9B illustrates the spectral response curve for a commercially available FPA having a Bayer filter similar to that illustrated in FIG. 9A (KODAK KAI-16000 Color Image Sensor, Eastman Kodak Company, Rochester, N.Y.). For further details on Bayer filters, see U.S. Pat. No. 3,971,065, the entire contents of which are incorporated herein by reference.

As illustrated in FIG. 9B, pixels of the FPA covered by green filters have a relatively large absolute quantum efficiency centered about 550 nm. Thus, if illumination subsystem 511 generates light pulses in the green portion of the spectrum, e.g., at 532 nm, the green filters (G) the underlying FPA pixel will be highly responsive, e.g., will have an absolute quantum efficiency of about 0.35. In contrast, those portions of the FPA covered by blue filters have a relatively large absolute quantum efficiency centered about 465 nm, and a relatively low efficiency at 532 nm, of approximately 0.10. Those portions of the FPA covered by red filters have a relatively large absolute quantum efficiency centered about 620 nm, and a relatively low efficiency at 532 nm, of less than about 0.01. Thus, if illumination subsystem 510 generates light pulses at 532 nm, pixels covered by green filters will be at least three times more responsive to reflected/scattered light pulse portions than pixels covered by blue filters, and at least thirty times more responsive than pixels covered by red filters. Thus, for monochromatic light, such color filters may be used to expand the dynamic range and resolution of the FPAs by a factor of thirty or more.

In some embodiments in which the FPAs include a color filter such as Bayer filter 900 illustrated in FIG. 9A, the energy of the light pulse generated by illumination subsystem 510 may be increased by 30 times or more above that energy which would otherwise have been near the saturation limit of the FPAs, to provide an effect similar to that provided by the method illustrated in FIG. 8, but without necessarily requiring the use of pulses of varying energies. Specifically, the pulse energy may be increased to a level at which the least responsive pixels (e.g., the pixels covered by red filters) are at or above a threshold percentage of the saturation limit of those pixels. At such an energy, the least responsive pixels may satisfactorily image objects in the scene that reflect/scatter the most light. The information from those pixels may be selected, e.g., based on a stored map of the filter, to construct a first image, similar to that produced at step 820 of FIG. 8. At this energy, the more highly responsive pixels (e.g., those covered by green or blue filters) that receive photons from the highly reflective/scattering objects in the scene may be saturated, while the least responsive pixels may receive an insufficient amount of light to satisfactorily resolve objects that are poorly reflective/scattering object. However, the more highly responsive pixels that receive photons from such poorly reflective/scattering objects in the scene may satisfactorily image such objects. The information from those pixels may be selected to construct a second image, similar to that produced at step 840 of FIG. 8. As many such images may be obtained as there are pixels of different responsiveness, and may be combined together to obtain a three dimensional image having increased resolution as compared to the image obtained using any one type of pixel.

Of course, the method of FIG. 8 may also be used with FPAs having color filters, to further extend the dynamic range and resolution of the three-dimensional imaging system. Additionally, filters other than a Bayer filter may be used to expand the dynamic range of the FPAs. For example, other color filters may be used, which may be based on RBG filters, CMYK filters, or other suitable filters, configured in any suitable pattern. Or, for example, patterns of attenuation (grayscale) filters may be used, in which any suitable number of different levels of attenuation (e.g., two or more, or three or more, or five or more, or ten or more) are provided in any suitable pattern. However, the use of Bayer filters may in some circumstances be the lowest-cost alternative because Bayer filters are often provided as a standard component of FPAs configured for use in the visible region of the spectrum. Whichever filter is selected, the response of the individual pixels may be calibrated using standard color/grayscale correction techniques to form a color/grayscale matrix that may be stored in storage 542 and used during the construction of different images based on different pixels. Additionally, instead of using filters, some FPAs include multiple sensors of different sensitivities at each pixel. Alternatively, the light collected by lens 521 may be separated into different optical paths, and the different optical paths attenuated by a known amount. An FPA may be provided at the end of each optical path, analogous to the way multi-chip color cameras split the 3 colors into 3 paths to 3 different FPAs. In such cases, the illuminating light pulse energy may be selected so as to nearly saturate the brightest pixel in the FPA receiving the most attenuated beam. As for the embodiment described above with reference to FIG. 8, controller 541 may send a control signal to illumination subsystem 510 that contain instructions on the appropriate pulse energy to be generated, or may send a control signal to an appropriate attenuation optic, if provided.

Another embodiment of the present invention makes use of binning pixels together to effectively achieve higher SNRs. For some FPAs, such as those including complementary metal oxide semiconductors (CMOS), it is possible to bin the pixels in to "superpixels" on the chip itself. For other FPAs, such binning may be performed by image constructor 543 to modify the information content of images in storage 542. By binning together 4 pixels, e.g., a 2 by 2 array of pixels, $N_{sig}$ may be increased by 2.

Another embodiment increases the SNR by averaging over time, e.g., by performing boxcar averaging. In some embodiments, controller 541 performs such averaging by integrating the reflected light from multiple laser pulses in the pair of complementary images obtained by FPAs 528, 529. In other embodiments, image constructor 543 performs such averaging by averaging the distance values in multiple stored three-dimensional images. Image constructor 543 may perform such image-to-image averaging even if an object in the scene, or the imaging system, is moving, by registering the pixels in each image to a single generalized coordinate frame of reference. Controller 541 and/or image constructor 543 may also apply other averaging and similar techniques to enhance the digital images and/or video, and these are generally applicable to the present invention to enhance the distance resolution. Controller 541 and/or image constructor 543 may apply such image enhancement techniques temporally across many pulses or images or spatially across many pixels, or both.

Systematic noise sources may also be present in system 500, such as pixel-to-pixel variation in the responses of FPAs 528 and 529, imperfect separation of the orthogonal light components by polarizing beamsplitter 527, and/or nonlinearities in the modulation of the reflected/scattered pulse portions by modulator 524, which may result from nonlinearities in the voltage ramp applied to modulator 524 and/or nonlinearities in the temporal response of the modulator to applied voltage. Embodiments of the present invention reduce such systematic noise sources by carefully calibrating system 500 following assembly. For example, the baseline response of the pixels of FPAs 528, 529 may be determined by using FPAs 528, 529 to obtain images of a series of uniformly flat, nonpolarizing surfaces having a specified range of reflectances, e.g., 10%, 20%, 30%, 40%, 50%, 60%, 70%, 80%, 90%, and 100%. Such a series of images alternatively may be obtained by varying the energies of pulses generated by illumination subsystem 510 by a similar series of percentages of the maximum energy. The levels used for calibration may be selected so that the result is valid over the dynamic range of the FPAs and the device. The series of images may be analyzed to generate a curve for each pixel that may be used to correct the response of each pixel so that the resulting image will be substantially uniform at each level of incident light. Such curves may be stored, for example, as a calibration matrix in storage 542, and used by image constructor 543 to correct the two-dimensional intensity images before using them to form three-dimensional images, such as illustrated in FIG. 3.

Suitable calibration techniques also may be used to accurately register the pixels of FPAs 528, 529. For example, a set of precision targets, whose centroid may be determined to a precision of much smaller than a single pixel (e.g., a sphere) may be imaged with the two FPAs. The FPAs may be mechanically adjusted (e.g., adjusted in the x, y, and d directions, along with tip and tilt) to register the images together, and/or any offsets may be electronically adjusted for (e.g., using image constructor 543).

As explained above with reference to equations (11) and (12), knowledge of the time- and voltage-dependent response function $g(V(t))$ of modulator 524 and time delay $t_0$ may be used to accurately obtain information about the distances of objects in the scene. Such a response function and time delay may in some embodiments be calibrated by making a series of measurements of a flat target, in which the target is moved between a range of distances that cover the total distance "depth of field" (distance window) that will be used for the application and the device. For example, if the modulator is to be generally linearly modulated over a time period corresponding to distances of 5 to 10 meters from the system, the calibration target may be positioned at 5 meters, 6 meters, 7 meters, 8 meters, 9 meters, and 10 meters from the device. As the pulse reflects off of the target at each position, the pulse's TOF will vary, so the pulse will experience a different time delay and portion of the modulation response function $g(V(t))$ of modulator 524. Because $z_{i,j}$ and $t_{i,j}$ are known from the calibration, $g(V(t))$ and $t_0$ may be calculated based on the intensity at each pixel i,j for FPAs 528, 529. A calibration curve for $g(V(t))$ may be stored, for example, in storage 542, and used by image constructor 543 to correct the two-dimensional intensity images before using them to form three-dimensional images, such as illustrated in FIG. 3.

Alternatively, a series of internal optical delays may be used to generate light pulses at a specific series of delays from the main illuminating light pulse. These optical delays may be routed internally to the device such that they pass through modulator 524 and on to FPAs 528, 529 when desired, e.g., responsive to a control signal by controller 541. These delays will correspond to precise distances that can produce the retardation delay functions g(V(t)) similar to the above-described embodiment. Alternatively, system 500 may include optical elements arranged so as to produce delays of sufficient length, after many bounces, over some geometric shape such as a wedge or line. In some embodiments, short pulse laser diodes may be triggered to emit short pulses (e.g. <1 ns) at specific intervals during the time window. In some embodiments, the optical delays may be created by splitting the calibration pulse into one of several optical fibers of determined lengths.

In addition to employing any of a variety of techniques to enhance the resolution of the three-dimensional images, controller 541 may further enhance the range of such images, which may also be referred to as the "depth of field" (DOF) or "distance window" of the images. Increasing the depth of field of an image may be especially useful when the system is used to obtain three-dimensional images or movies of complex scenes in which objects in the scene are positioned across a range of distances. For example, as noted above with reference to FIG. 2, the modulation of pulse portions reflected/scattered by the scene may occur over a temporal window having a defined start time and defined duration, which correspond to a defined distance window. If the system were limited to acquiring information about objects only within such a distance window, its applicability might be limited.

First, the depth of field may be set to larger than other devices produced, such as that of Taboada, because system 500 has a larger dynamic range. Because $N_{sig}$ is significantly larger, increased distance resolution may be achieved while simultaneously setting the modulation period to be larger, yielding a greater depth of field.

Figure 10:
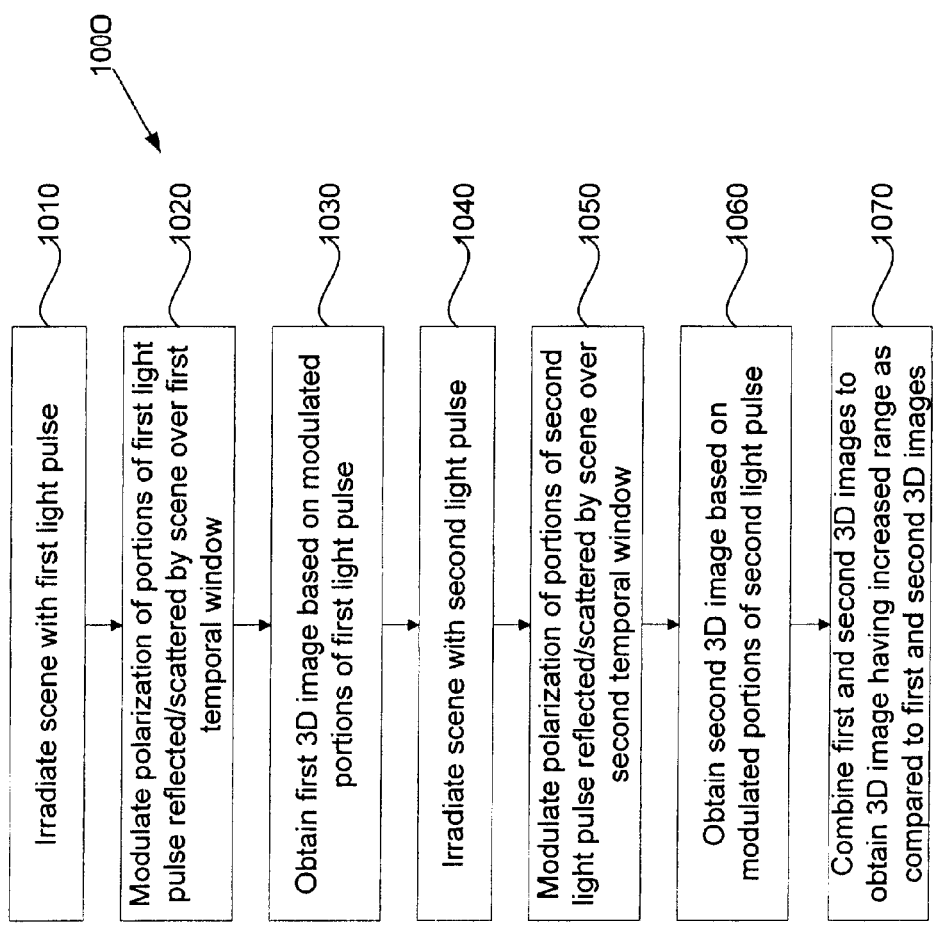
FIG. 10 illustrates steps in a method of extending the range of a three-dimensional image, according to some embodiments of the present invention.

Additionally, FIG. 10 illustrates an "adaptive depth of field" method by which controller 541 of FIG. 5 may further extend the distance window of a three dimensional image. For example, it may be desired to obtain an image of a scene over a distance window (depth of field) between 5 and 55 meters from the imaging system 500, but the distance window of any single frame may be limited to 10 meters in order to achieve the desired distance resolution. To obtain a three-dimensional image having an increased range as compared to that obtainable with a single frame, the scene may first be irradiated with a first light pulse (1010), for example responsive to a control signal that controller 541 transmits to illumination subsystem 540. As the portions of the first light pulse reflected/scattered by the scene are transmitted through modulator 524, the polarization of those portions are modulated over a first temporal window (1020). Such a temporal window may, for example, be selected to correspond to a distance window of 10 meters, beginning at a distance of 5 meters from the imaging system. A first three-dimensional image is obtained based on the modulated portions of the first light pulse (1030), for example using image constructor 543. Continuing with the example provided above, such an image may for example contain information about objects positioned 5-15 meters from the imaging system.

The scene may then be irradiated with a second light pulse (1040), which in some embodiments may be of substantially the same energy as the first light pulse. As the portions of the second light pulse reflected/scattered by the scene are transmitted through modulator 524, the polarization of those portions are modulated over a second temporal window (1050). Such a second temporal window may begin and end at any desired time, for example, may overlap with the first temporal window, or may be immediately before or after the first temporal window. The second temporal window may have the same duration as the first temporal window, or may be longer or shorter, as appropriate.

For example, the first temporal window may be selected to collect information about a first distance window of the scene that contains little information of interest, and so may have a broadened temporal duration (corresponding to a lower resolution), whereas the second temporal window may be selected to collect information about a second distance window of the scene that contains an object of interest, and so may have a shortened temporal duration (corresponding to a higher resolution). A second three-dimensional image is then obtained based on the modulated portions of the second light pulse (1060). Continuing with the example provided above, the second image may contain information about objects positioned 15-25 meters from the imaging system. Any desired number of additional images may be obtained by repeating steps 1040 to 1060 over other modulation windows. The first and second images (as well as any other images) may be combined to obtain a three-dimensional image having increased range as compared to the first and second images (1070).

The method illustrated in FIG. 10, like other methods described herein, may also be applied to the acquisition of movies. Such movies may, for example, contain an object that moves over time relative to a comparatively stationary background, where the moving object is of primary interest and is located within a particular distance window (the location of which may shift over time). The scene may be irradiated with a first pulse, the reflected/scattered portions of which are modulated over a first time window selected to correspond to all or a portion of the background, to form a first three-dimensional image. The scene then may be irradiated with a second pulse, the reflected/scattered portions of which are modulated over a second time window selected to encompass the moving object of interest, to form a second three-dimensional image. The second time window may be related in any desired way to the first time window. For example, the second time window may be narrower than the first time window to obtain information about the moving object with higher resolution than the background. The second time window may also be completely or partially encompassed by the first time window, so that the second image contains some of the information contained in the first image, although at higher resolution. Alternatively, the second time window may be nonoverlapping with the first time window, so as to contain information about a separate, nonoverlapping spatial region of the scene. The first and second images may be combined to form a three-dimensional image that constitutes a first three-dimensional frame of the movie.

The scene may then be irradiated with a third pulse, the reflected/scattered portions of which are modulated over a third time window selected to encompass the moving object of interest, to form a third three-dimensional image. The third time window may, for example, be the same as the second time window, or may overlap with the second time window, or may be nonoverlapping with the second time window, depending on how quickly the object of interest is moving. The third image may be combined with the first image to form a three-dimensional imaged that constitutes a second three-dimensional frame of the movie. Because the background is unchanging, or changing relatively slowly as compared to the object of interest, the background image (the first image) may be used to form several frames of the movie without losing information about the object of interest, and thus may reduce the time and computation involved in acquiring a series of three-dimensional movie frames. Such background images may be acquired at any desired rate, which may be some fraction of the rate at which images of the moving object are acquired, for example, at half the rate, or at a third of the rate, or a quarter of the rate, or a fifth of the rate, or a tenth of the rate.

Additionally, although some of the above-described embodiments linearly modulate the polarization of the reflected/scattered pulse portions, other modulation waveforms, including non-monotonic (but not necessarily periodic) waveforms such as a sine wave or a sawtooth, may effectively be used to increase the depth of field of the three-dimensional imaging system. For example, with reference to FIG. 11, alternative system 1100 includes receiving (Rx) lens 1121 and band-pass filter (BPF) 1122, which may be similar to the corresponding elements in FIG. 5, and first and second modulation arms 1110, 1120. System 1100 optionally may also include a visible imaging subsystem such as that illustrated in FIG. 5, but omitted in FIG. 11 for simplicity.

System 1100 includes beamsplitter 1123, which optionally is a polarizing beamsplitter and which allows some of the light from band-pass filter 1122 to be transmitted to first modulation arm 1120, and redirects other of the light from the band-pass filter to second modulation arm 1110. First modulation arm 1120 includes modulator 1124, compensator (Cp.) 1125, imaging lens 1126, polarizing beamsplitter 1127, and first and second FPAs 1128, 1129, each of which may be the same as the corresponding components discussed above with reference to FIG. 5. Second modulation arm 1110 includes modulator 1114, compensator (Cp.) 1115, imaging lens 1116, polarizing beamsplitter 1117, and first and second FPAs 1118, 1119, each of which may be the same as the corresponding components in first modulation arm 1120. System 1100 may also include an illumination subsystem and an image processing subsystem that includes a controller, which may be the same as those described above with reference to FIG. 5. In some embodiments, either the modulation arm 1110 or the modulation arm 1120 may only use a single FPA 1119 or 1129, respectively, because the normalization image may be obtained from the other arm.

During operation, the controller (not illustrated) of system 1100 may send different control signals to modulator 1124 than to modulator 1115. For example, the controller may send a control signal to modulator 1124 instructing it to vary the polarization of pulse portions transmitted therethrough monotonically as a function of time. In comparison, the controller may send a control signal to modulator 1114 instructing it to vary the polarization of pulse portions transmitted therethrough non-monotonically, e.g., using a sine wave or sawtooth function that repeats multiple times during the duration of the single monotonic modulation of modulator 1124. The images obtained by FPAs 1128, 1129 on first modulation arm 1120 may contain information about a relatively wide distance window, e.g., a 50 meter window. Because this arm does not need to achieve the same resolution, in some embodiments it may be useful to choose beamsplitter 1123 such that the fraction of light going to this arm is <50%. In contrast, the images obtained by FPAs 1118, 1119 on second modulation arm 1110 may contain information about a relatively narrower distance window that is encompassed by the wider distance window obtained by the first modulation arm. Information in the image obtained by the first modulation arm may be used to fix the position of objects in the image obtained by the second modulation arm, thus providing for simultaneous three-dimensional measurement across the entire depth of field.

In another embodiment, the initial distance to a key feature may be determined approximately by a single ranging photodiode or several photodiodes during the previous frame. The timing of the center of the modulation period for subsequent frames may be set in one of several ways. For example, it may be set to the initial value, or may be set based on a trend of a key feature in a series of previous frames, or may be set using optical auto-focus techniques. If more than one ranging diode or auto-focus position is used, algorithms similar to those used in optical auto-focus mechanisms to perform a weighted average of these multiple sites or diodes may be used.

In combination with these embodiments, the length of the depth of field (distance window) may be adjusted as appropriate, e.g., by varying the duration of the pulse portion modulation imparted by modulator 524 responsive to control signals from controller 541 in FIG. 5. In addition, if it is desired to obtain higher distance resolution over a certain region of the DOF, the slope of the modulation may be increased in that region. The slope may then be decreased during the remainder of the modulation period, producing a lower distance resolution in other areas of the scene where the greater resolution is not needed. It should be appreciated that there are many combinations that may be used to achieve a satisfactory three-dimensional image or movie.

As previously mentioned, the three-dimensional images may be registered to a global coordinate reference frame, if desired, either GPS-based or some other desired reference frame. Such registration may provide the ability to use the data from different frames to perform image enhancement algorithms. It also may provide a mechanism to use the image and video information from several frames to create a substantially complete three-dimensional representation of the scene or object(s) within the scene. This may be done from different perspectives. For example, an object or group of objects may rotate about some axis such that after a certain number of frames, all sides of the object(s) have been imaged. The rotation need not be uniform. The data from the images may then be assembled into a full three-dimensional representation of the surfaces of the object. Alternatively, the user of the imaging system 500 may move the camera around the object(s) of interest and thereby obtain all necessary 3D image information. In some embodiments, several imaging systems 500 can be placed around object(s) of interest and the 3D images from these systems can be combined to create a full three-dimensional representation of the surfaces of the object(s). It then may be viewed as if it were a solid object(s), and all sides may be viewed in detail using 3D manipulation software.

In various embodiments of the invention, any suitable technique may be used to register the frames of the various FPAs with one other. For example, digital video cameras use software to remove motion blur from frame to frame. This technique is known as image stabilization, and alternatively may be employed in the present invention to register the points in subsequent three-dimensional frames to points in a first (or reference) frame.

In general, various embodiments of the invention make use of other 3D processing techniques to improve the distance resolution and performance of the system. For example, one embodiment uses known techniques to extract distance information from the image information. Examples of such image information include perspective cues and shadow cues, which are currently used to extract some low resolution 3D information from existing 2D still and video images. Data from such cues may be employed in the present invention (e.g., implemented by image constructor 543) to improve the distance resolution and improve the depth of field (distance window) of the system.

Another embodiment uses techniques such as stereophotogrammetry if there are multiple three-dimensional imaging devices being used to image the same scene. Or, if the imaging device is moving with respect to the scene, another embodiment may employ triangulation from different viewpoints to calculate depth. The resulting data may be used to improve the distance resolution obtained from the time of flight technique and to extend the depth of field (depth window).

Another embodiment measures the polarization state of the light pulse portions reflected/scattered by objects the scene. Such polarization states may, in some circumstances, contain additional information about objects in the scene. For example, natural objects tend to change the polarization state of light they reflect, while man-made objects tend not to do so. There may be techniques to use such polarization information to determine the direction of the surface normal of the object area imaged at a given pixel. This surface normal and the change in the surface normal from pixel-to-pixel may be used to improve the distance resolution and extend the depth of field. In one embodiment, the polarization state of the light pulse portions reflected/scattered by objects in the scene may be determined by modifying system 1100, illustrated in FIG. 11, to replace beamsplitter 1123 with a polarizing beamsplitter. Any light that experienced a polarization rotation upon interaction with objects in the scene may be directed onto the second modulation arm 1110, while light that did not experience a polarization rotation may be transmitted onto the first modulation arm 1120. The controller (not illustrated) may send substantially the same control signals to both modulators 1124, 1114, e.g., instructing the modulators to monotonically (for example, linearly) vary the polarization of light transmitted therethrough over a defined temporal window, such as illustrated in FIG. 2. Thus, the FPAs on both of the modulation arms 1120, 1110 may obtain two-dimensional intensity images of generally the same scene, over substantially the same distance window. However, the images obtained by FPAs 1118, 1119 on the second modulation arm 1110 will substantially only contain information objects that changed the polarization of the incident light. Such information may be combined with the three-dimensional image obtained using the images from FPAs 1128, 1129 to produce an image having enhanced information content.

In general, three-dimensional information about a scene may be obtained using any number of different modalities, each of different quality, spatial scale, resolution, and sensitivities. Embodiments of the invention may take advantage of any or all of this information by using information theory and image processing algorithms to combine this information into a single representation of the scene. The different scales and sensitivities of the information may be useful in this respect. The result is to improve the distance and spatial resolution and to extend the depth of field as well as improve the color or grey scale imagery and video.

Figure 11:
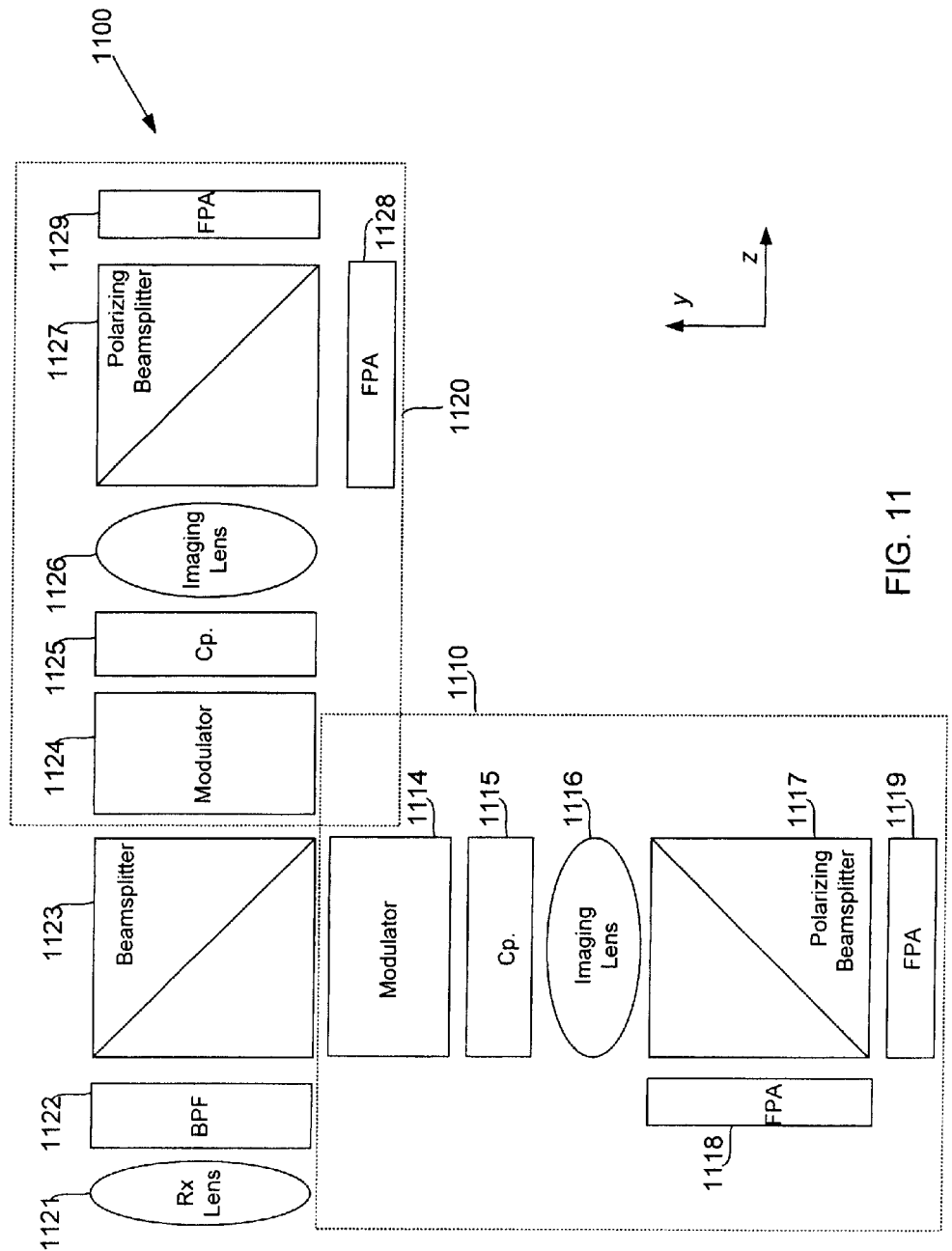
FIG. 11 schematically illustrates an alternative embodiment of a three-dimensional imaging system, according to some embodiments of the present invention.

Another aspect of enhancing the performance of systems such as system 500 illustrated in FIG. 5, or system 1100 illustrated in FIG. 11, pertains to controlling uncertainties related to the temporal and thermal behavior of the electronic components of the system. This may include timing circuits, the modulation waveform, and the focal plane array circuitry. Some of such control may be based on the processor subsystem, while other of such control may be based on the design of other components in the system.

For example, to achieve an uncertainty of less than 0.1% in range resolution across a segment of the waveform may be known to 1 part in 1000, or to within 0.1%. This may be accomplished either by circuit designs so that the waveform does not vary from image to image by more than the desired uncertainty, or by including a circuit that measures and digitizes each waveform to less than the desired uncertainty. This may also apply to any delays that may exist within the system, such as the time delay that may be present for the waveform's applied voltages to propagate across the aperture of the Pockels cell (or Pockels assembly).

The timing circuitry that determines the delay between the laser pulse and the start of the modulation waveform may be made more precise than the desired uncertainty of the range measurement. This type of timing error only affects absolute accuracy, not the relative accuracy between objects in a single frame. As part of this, the timing of the laser pulse may be measured to at least as precisely. One way to accomplish this is to use a laser design that ensures that there is only one global peak in the laser temporal profile and that the temporal profile is relatively smooth by ensuring either a single temporal mode, or that many temporal modes (e.g., more than 20, more than 30, or more than 50) are present. Then, a peak detect algorithm (which may be performed by the processor subsystem) may identify the temporal position of the peak to some fraction of the laser pulse length. In some embodiments, a threshold algorithm may be used rather than a peak-detect algorithm to determine the temporal position of the laser pulse. The signal of the laser pulse will be collected by a single fast photodiode and an analog-to-digital converter with digital resolution below the desired uncertainty. In one illustrative embodiment, the position of the peak of the laser pulse, or other identifiable portion of the laser pulse, is identified with an error of less than 3 picoseconds. The time lapse between the laser pulse and the beginning of the modulation waveform may then be controlled with an error of less than 3 picoseconds.

The readout circuitry and gain values in the focal plane arrays may also be known from frame to frame to a lower uncertainty than is desired for the range measurement. Provided that the behavior does not change significantly from image to image or pulse to pulse, the behavior of the readout and gain circuitry with respect to measured signal at each pixel may be measured using calibration targets to remove any systematic errors by calibration.

There are many variations and embodiments to the general design to accomplish three-dimensional measurement. In addition, range performance may be improved by averaging and other noise reduction techniques beyond those described herein. In some embodiments, it may be preferable to control any or all timing variations within the system to better than 0.1%.

4. Applications

It is anticipated that the three-dimensional imaging systems and methods provided herein may be used successfully in a wide variety of industries, including shipbuilding, civil construction, road surveying, utility corridor mapping, forensics and law enforcement, heavy industry, industrial construction, video games, motion pictures, motion picture special effects, archaeology, medical imaging, facial recognition, machine vision, quality control, aerospace and automotive components, medical prosthetics, dentistry, sports, sports medicine, among others. For example, the CyARK foundation is endeavoring to digitally preserve three-dimensional information about the vast number of disappearing historical sites throughout the world. The inventive systems and methods may drastically increase the rate at which such information may be acquired, while improving the quality of the information. Or, for example, existing structures may be surveyed to obtain as-built information, which optionally may be used to design retro-fits, renovations, and other construction work. Or, for example, the mining industry may use the systems and methods to determine volumes of material removed, or the structure of a mine area. Or, for example, the civil and transportation industry may use the systems and methods to provide a cost-effective method for monitoring transportation and civil infrastructure to identify failing structures (e.g. bridges, buildings, pipelines) prior to catastrophic events.

5. Alternative Embodiments

Although the embodiments described above include refractive optics, analogous embodiments may be constructed that utilize reflective optics in place of one or more of the refractive optics.

Not all embodiments require the use of a pair of FPAs to record complementary intensity images. For example, Yafuso (U.S. Pat. No. 7,301,138, the entire contents of which are incorporated herein by reference) discloses the use of a prism to produce two complementary polarization images on a single camera. In one embodiment, with reference to FIG. 5, polarizing beamsplitter 527 and FPA 528 may be omitted, and a prism such as disclosed by Yafuso included between imaging lens 526 and FPA 529. The prism is configured to direct the two complementary polarization images onto FPA 529, which is preferably sized to record both images. Controller 541 may obtain the pair of simultaneously recorded images from FPA 529 and provide them to storage 542, which later may be accessed by image constructor 543, which may separately analyze and the two images. Suitable calibration techniques may be used to accurately register the pixels that record the first image with those that record the second image. For example, a set of precision targets, whose centroid may be determined to a precision of much smaller than a single pixel (e.g., a sphere) may be imaged in two different locations on the FPA. The tip, tilt, pincushion, and keystone of the two images may be brought into registration using software (e.g., image constructor 543).

Figure 12:
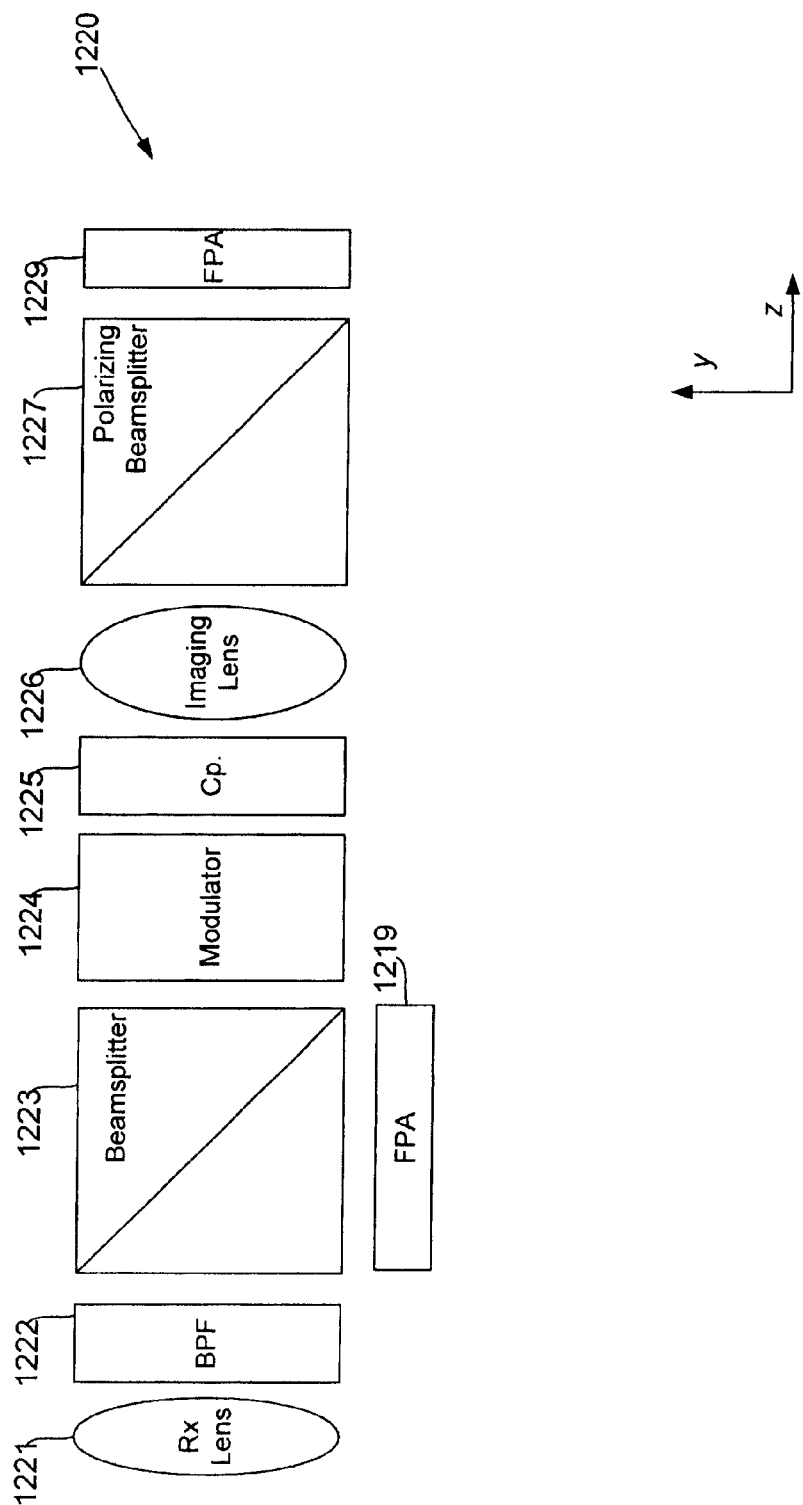
FIG. 12 schematically illustrates an alternative embodiment of a three-dimensional imaging system, according to some embodiments of the present invention.

FIG. 12 illustrates an alternative sensor subsystem 1220 that may, for example, be used in place of sensor subsystem 520 illustrated in FIG. 5. Sensor subsystem 1220 optionally may include visible imaging subsystem 530, omitted from FIG. 12 for clarity. Sensor subsystem include receiving (Rx.) lens 1221, band-pass filter (BPF) 1222, modulator 1224, compensator (Cp.) 1225, imaging lens 1226, polarizing beamsplitter 1227, and FPA 1229, each of which may be the same as described above with respect to the corresponding components illustrated in FIG. 5. However, sensor subsystem 1220 also includes beamsplitter 1223 which is at any suitable position before the modulator (here, between bandpass filter 1222 and modulator 1224), which directs a portion of the received light to FPA 1219, which obtains an image of the scene based thereon. The remainder of the light is transmitted to modulator 1224, which modulates the light transmitted therethrough, and FPA 1229 obtains an image of the scene based thereon. The images obtained by FPA 1219 and FPA 1229 differ in that the former is based on unmodulated light, while the latter is based on modulated light. The image obtained by FPA 1219 may be used to normalize the image obtained by FPA 1229. Specifically, the intensity at any pixel (i,j) of FPA 1219 may be used as the value $I_{total,i,j}$ in the distance calculations discussed above with reference to equations (8) to (15). In contrast, for the embodiment illustrated in FIG. 5, the value $I_{total,i,j}$ may be calculated by summing the complementary images obtained by FPAs 528, 529. It should be noted that in any alternative embodiment in which a non-modulated image is obtained, the intensity of that image at each pixel (i,j) may be used as the value $I_{total,i,j}$ against which a modulated image may be normalized to obtain distance values, e.g., using equations (8) to (15).

In one embodiment, first and second discrete FPAs 1219, 1229 constitute a means for generating a first image corresponding to received light pulse portions and a second image corresponding to modulated received light pulse portions. For example, the first image may correspond to the nonmodulated image obtained by FPA 1219, and the second image may correspond to the modulated image obtained by FPA 1229. In another embodiment, a single FPA constitutes a means for generating a first image corresponding to received light pulse portions and a second image corresponding to modulated received light pulse portions. For example, the first image may correspond to a non-modulated image obtained by the FPA, and the second image may correspond to a modulated image obtained by the same FPA.

While preferred embodiments of the invention are described herein, it will be apparent to one skilled in the art that various changes and modifications may be made. The appended claims are intended to cover all such changes and modifications that fall within the true spirit and scope of the invention.

What is claimed is:

1. A three-dimensional imaging system, comprising:
an illumination subsystem configured to emit a light pulse with a divergence sufficient to irradiate a scene having a wide field of view;
a sensor subsystem configured to receive over a wide field of view portions of the light pulse reflected or scattered by the scene, the sensor subsystem comprising:
a modulator configured to modulate as a function of time an intensity of the received light pulse portions to form modulated received light pulse portions; and
means for generating a first image corresponding to the received light pulse portions and a second image corresponding to the modulated received light pulse portions; and
a processor subsystem configured to obtain a three-dimensional image based on the first and second images;
wherein at least one of the first and second images contains a region of maximum intensity, wherein the means for generating comprises a sensor array having a saturation limit, and wherein the system is configured to enhance a dynamic range of the three-dimensional image by increasing an energy of the light pulse above the saturation limit of the sensor array.

2. The system of claim 1, wherein the means for generating comprises first and second discrete arrays of light sensors.

3. The system of claim 2, wherein the means for generating further comprises an image constructor.

4. The system of claim 1, wherein the means for generating comprises a single array of light sensors.

5. The system of claim 1, wherein the light pulse has a duration of less than 2 nanoseconds.

6. The system of claim 1, wherein the divergence is between 1 and 180 degrees.

7. The system of claim 1, wherein the divergence is between 5 and 40 degrees.

8. The system of claim 1, wherein the illumination subsystem comprises a low-coherence laser configured to generate light pulses containing a sufficient number of spatial modes to produce a smooth spatial profile.

9. The system of claim 1, wherein the light pulse contains a wavelength between 1400 nm and 2500 nm.

10. The system of claim 1, wherein the modulator comprises a Pockels cell.

11. The system of claim 1, wherein the processor subsystem comprises a controller configured to send a control signal to the modulator, the modulator configured to modulate the received light pulse portions monotonically as a function of time responsive to the control signal.

12. The system of claim 1, wherein the processor subsystem comprises a controller configured to send a control signal to the modulator, the modulator configured to modulate the received light pulse portions non-monotonically as a function of time responsive to the control signal.

13. The system of claim 1, wherein the means for generating includes at least one focal plane array comprising a plurality of pixels, each pixel having a well depth of 100,000 or more electrons.

14. The system of claim 1, wherein the means for generating includes at least one focal plane array comprising a plurality of pixels, and further comprising a filter having a plurality of regions, each region positioned in front of a pixel and configured to attenuate light transmitted to that pixel in a predetermined fashion.

15. The system of claim 1, wherein the sensor subsystem further comprises a broadband or multiband imaging subsystem, the imaging subsystem comprising:
   an image sensor configured to obtain a broadband or multiband image of the scene; and
   an optic configured to direct a portion of the received light to the image sensor.

16. The system of claim 1, wherein the processor subsystem is configured to:
   instruct the illumination subsystem to emit a plurality of light pulses;
   adjust a timing of the modulator such that modulation begins at a different time for each light pulse of the plurality of light pulses;
   obtain a plurality of three-dimensional images, each of the three-dimensional images respectively corresponding to a light pulse of the plurality of light pulses; and
   obtain an enhanced three-dimensional image based on the plurality of three-dimensional images, the enhanced three-dimensional image corresponding to a larger distance window than a distance window of any of the plurality of three-dimensional images.

17. A method of three-dimensional imaging, comprising:
   emitting a light pulse having a divergence sufficient to irradiate a scene having a wide field of view;
   receiving, at a sensor array, over a wide field of view portions of the light pulse reflected or scattered by the scene;
   modulating with a modulator the received light pulse portions as a function of time to form modulated received light pulse portions;
   generating a first image corresponding to the received light pulse portions;
   generating a second image corresponding to the modulated received light pulse portions, wherein at least one of the first and second images contains a region of maximum intensity;
   obtaining a three-dimensional image of the scene based on the first and second images; and
   enhancing a dynamic range of the three-dimensional image by increasing an energy of the light pulse above a saturation limit of the sensor array.

18. The method of claim 17, wherein generating the first image comprises adding the second image to a third image.

19. The method of claim 17, wherein modulating with the modulator comprises modulating a polarization state of the received light pulse portions.

20. The method of claim 17, wherein the modulator includes a Pockels cell.

* * * * *